(12) United States Patent
Bent et al.

(10) Patent No.: US 7,536,350 B1
(45) Date of Patent: May 19, 2009

(54) SYSTEMS AND METHODS FOR PROVIDING ENHANCED ACCOUNT MANAGEMENT SERVICES FOR MULTIPLE BANKS

(75) Inventors: Bruce Bent, New York, NY (US); Bruce Bent, II, New York, NY (US)

(73) Assignee: Island Intellectual Property LLC, New York, NY (US)

( * ) Notice: Subject to any disclaimer, the term of this patent is extended or adjusted under 35 U.S.C. 154(b) by 1404 days.

(21) Appl. No.: 10/382,946

(22) Filed: Mar. 6, 2003

Related U.S. Application Data

(63) Continuation-in-part of application No. 10/071,053, filed on Feb. 8, 2002, and a continuation-in-part of application No. 09/677,535, filed on Oct. 2, 2000, said application No. 10/071,053 is a continuation-in-part of application No. 09/176,340, filed on Oct. 21, 1998, now Pat. No. 6,374,231, said application No. 09/677, 535 is a continuation-in-part of application No. 09/176,340, filed on Oct. 21, 1998, now Pat. No. 6,374, 231.

(60) Provisional application No. 60/442,849, filed on Jan. 27, 2003.

(51) Int. Cl.
*G06Q 40/00* (2006.01)
(52) U.S. Cl. .............................. 705/39; 705/38; 705/35
(58) Field of Classification Search .................. 705/39, 705/35
See application file for complete search history.

(56) References Cited

U.S. PATENT DOCUMENTS

| 4,232,367 A | 11/1980 | Youden et al. ............... 364/408 |
| 4,346,442 A | 8/1982 | Musmanno ................. 364/408 |
| 4,376,978 A | 3/1983 | Musmanno ................. 364/408 |
| 4,597,046 A | 6/1986 | Musmanno ................. 364/408 |
| 4,674,044 A | 6/1987 | Kamus ....................... 364/408 |

(Continued)

FOREIGN PATENT DOCUMENTS

| JP | 10049590 | 2/1998 |

(Continued)

OTHER PUBLICATIONS

Mutual Funds Magazine, Bargain Basement Funds, Oct. 1997, 2 Sheets.

(Continued)

*Primary Examiner*—Jagdish N Patel
(74) *Attorney, Agent, or Firm*—Foley & Lardner LLP

(57) ABSTRACT

This invention includes methods for delivering account management services to multiple financial institutions that provide for customer deposit accounts without transaction but than nevertheless offer interest and receive enhanced deposit insurance. The methods apply at least one customer transaction to that customer's deposit account, and then re-allocate customer-deposited funds among the plurality of financial institutions in order that, for each customer, the risk of loss is not substantially increased, and that, for each financial institution, the amount of customer-deposited funds is not substantially decreased. Preferably, risk of loss is reduced by increasing the fraction of each customer's deposited funds covered by FDIC deposit insurance, and interest and enhanced insurance are available by innovative management of customer transactions and accounts. This invention also includes computer systems for practicing the methods and program products for accordingly configuring such computer systems.

18 Claims, 5 Drawing Sheets

U.S. PATENT DOCUMENTS

| | | | | |
|---|---|---|---|---|
| 4,694,397 | A | 9/1987 | Grant | 364/408 |
| 4,700,297 | A | 10/1987 | Hagel | 364/408 |
| 4,751,640 | A | 6/1988 | Lucas et al. | 364/408 |
| 4,774,663 | A | 9/1988 | Musmanno | 364/408 |
| 4,953,085 | A | 8/1990 | Atkins | 364/408 |
| 4,985,833 | A * | 1/1991 | Oncken | 705/42 |
| 5,126,936 | A | 6/1992 | Champion et al. | 364/408 |
| 5,206,803 | A | 4/1993 | Vitagliano | 364/408 |
| 5,235,507 | A | 8/1993 | Sackler | 364/401 |
| 5,262,942 | A | 11/1993 | Earle | 364/408 |
| 5,270,922 | A | 12/1993 | Higgins | 364/408 |
| 5,291,398 | A | 3/1994 | Hagan | |
| 5,297,032 | A | 3/1994 | Trojan | 364/408 |
| 5,424,938 | A | 6/1995 | Wagner et al. | |
| 5,631,828 | A | 5/1997 | Hagan | |
| 5,671,363 | A | 9/1997 | Christofich | 395/237 |
| 5,689,650 | A | 11/1997 | McClelland et al. | 705/36 |
| 5,710,889 | A | 1/1998 | Clark | 395/244 |
| 5,765,144 | A | 6/1998 | Larche | 705/38 |
| 5,774,880 | A | 6/1998 | Ginsberg | 705/36 |
| 5,781,654 | A | 7/1998 | Carney | 382/137 |
| 5,806,048 | A | 9/1998 | Kiron et al. | 705/36 |
| 5,806,049 | A | 9/1998 | Petruzzi | 705/36 |
| 5,812,987 | A | 9/1998 | Luskin | 705/36 |
| 5,826,243 | A | 10/1998 | Musmanno | 705/35 |
| 5,852,811 | A | 12/1998 | Atkins | 705/35 |
| 5,864,685 | A | 1/1999 | Hagan | |
| 5,878,258 | A | 3/1999 | Pizi | 395/682 |
| 5,878,405 | A | 3/1999 | Grant et al. | |
| 5,890,141 | A | 3/1999 | Carney | 705/45 |
| 5,893,078 | A | 4/1999 | Paulson | 705/35 |
| 5,903,881 | A | 5/1999 | Schrader et al. | 705/42 |
| 5,905,974 | A | 5/1999 | Fraser | 705/37 |
| 5,940,809 | A | 8/1999 | Musmanno | 705/35 |
| 5,941,996 | A | 8/1999 | Smith | 714/47 |
| 5,946,667 | A | 8/1999 | Tull, Jr. et al. | 705/36 |
| 5,950,175 | A | 9/1999 | Austin | 705/35 |
| 5,974,390 | A | 10/1999 | Ross | 705/4 |
| 5,978,779 | A | 11/1999 | Stein | 705/37 |
| 6,014,642 | A | 1/2000 | El-Kadi et al. | 705/36 |
| 6,016,482 | A | 1/2000 | Molinari | 705/35 |
| 6,026,438 | A | 2/2000 | Piazza | 709/221 |
| 6,041,314 | A | 3/2000 | Davis | |
| 6,044,371 | A | 3/2000 | Person | 707/6 |
| 6,047,324 | A | 4/2000 | Ford | 709/227 |
| 6,052,673 | A | 4/2000 | Leon et al. | |
| 6,088,685 | A | 7/2000 | Kiron et al. | 705/1 |
| 6,092,056 | A | 7/2000 | Tull, Jr. et al. | 705/36 |
| 6,105,005 | A | 8/2000 | Fuhrer | 705/35 |
| 6,108,641 | A | 8/2000 | Kenna | 705/35 |
| 6,112,191 | A | 8/2000 | Burke | |
| 6,131,810 | A | 10/2000 | Weiss | 235/379 |
| 6,154,770 | A | 11/2000 | Kostakos | 709/217 |
| 6,189,785 | B1 | 2/2001 | Lowery | |
| 6,226,623 | B1 | 5/2001 | Schein et al. | 705/35 |
| 6,374,231 | B1 | 4/2002 | Bent et al. | 705/40 |
| 7,103,556 | B2 | 9/2006 | Del Rey et al. | |
| 7,133,840 | B1 | 11/2006 | Kenna et al. | |
| 7,206,761 | B2 | 4/2007 | Colvin | |
| 7,216,100 | B2 | 5/2007 | Elliott | |
| 7,376,606 | B2 | 5/2008 | Jacobsen | |
| 2001/0032182 | A1 | 10/2001 | Kumar et al. | |
| 2002/0007330 | A1 | 1/2002 | Kumar et al. | |
| 2002/0069147 | A1 | 6/2002 | Sheehan et al. | |
| 2002/0091637 | A1 | 7/2002 | Bent et al. | |
| 2002/0128951 | A1 | 9/2002 | Kiron et al. | |
| 2002/0161707 | A1 | 10/2002 | Cole et al. | |
| 2002/0165757 | A1 | 11/2002 | Lisser | |
| 2002/0178098 | A1 | 11/2002 | Beard | |
| 2003/0023529 | A1 | 1/2003 | Jacobsen | |
| 2003/0135437 | A1 | 7/2003 | Jacobsen | |
| 2003/0149646 | A1 | 8/2003 | Chen et al. | |
| 2003/0177092 | A1 | 9/2003 | Paglin | |
| 2003/0191702 | A1 | 10/2003 | Hurley | |
| 2003/0236728 | A1 | 12/2003 | Sunderji et al. | |
| 2004/0039674 | A1 | 2/2004 | Coloma | |
| 2004/0107157 | A1 | 6/2004 | Bleunven et al. | |
| 2004/0111361 | A1 | 6/2004 | Griffiths et al. | |
| 2004/0128229 | A1 | 7/2004 | Raines et al. | |
| 2004/0128235 | A1 | 7/2004 | Kemper et al. | |
| 2004/0162773 | A1 | 8/2004 | Del Rey et al. | |
| 2005/0044038 | A1 | 2/2005 | Whiting et al. | |
| 2005/0091137 | A1 | 4/2005 | Woeber | |
| 2005/0102225 | A1 | 5/2005 | Oppenheimer et al. | |
| 2005/0102226 | A1 | 5/2005 | Oppenheimer et al. | |
| 2005/0108120 | A1 | 5/2005 | Malka et al. | |
| 2005/0108149 | A1 | 5/2005 | Bent et al. | |
| 2005/0114246 | A1 | 5/2005 | Coloma | |
| 2005/0154662 | A1 | 7/2005 | Langenwalter | |
| 2005/0228733 | A1 | 10/2005 | Bent et al. | |
| 2006/0106703 | A1 | 5/2006 | Del Rey et al. | |
| 2006/0155644 | A1 | 7/2006 | Reid et al. | |
| 2006/0167773 | A1 | 7/2006 | Yang et al. | |
| 2006/0273152 | A1 | 12/2006 | Fields | |
| 2007/0043666 | A1 | 2/2007 | Burdette | |
| 2007/0255655 | A1 | 11/2007 | Kemper et al. | |
| 2007/0276752 | A1 | 11/2007 | Whiting et al. | |
| 2007/0288400 | A1 | 12/2007 | Menon | |
| 2008/0015985 | A1 | 1/2008 | Abhari et al. | |
| 2008/0046358 | A1 | 2/2008 | Holm-Blagg et al. | |
| 2008/0065532 | A1 | 3/2008 | De La Motte | |
| 2008/0097899 | A1 | 4/2008 | Jackson et al. | |
| 2008/0133280 | A1 | 6/2008 | Ziegler | |

FOREIGN PATENT DOCUMENTS

| | | |
|---|---|---|
| WO | WO 95/23379 | 8/1995 |
| WO | WO-99/18529 | 4/1999 |
| WO | WO-03/012580 | 2/2003 |
| WO | WO-2005/006111 | 1/2005 |

OTHER PUBLICATIONS

Mutual Funds Magazine, Bargain Basement Funds, Oct. 1997, 1 Sheet.

Mutual Funds Magazine, Bargain Basement Funds, Oct. 1997, 1 Sheet.

Money Fund Report, IBC Financial Data, Inc., Nov. 6, 1998, 1 Sheet.

Liberman et al., Market Watch, "How Important are Banks?" FDIC Insurance on Deposits Just One Continuing Advantage, Oct. 17, 2006, 3 Sheets.

Declaration of Mr. Bruce Bent II, Vice Chairman and Registrant of Applicant. (3 Sheets) and Exhibits A, B, C and D (6 Sheets).

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

Bent, "Bruce Bent Makes Money Market Funds Act Like Bank Accounts," Equity BBDP, Oct. 5, 1998, 3 Sheets.

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Britt, "Struggling with Sweep Accounts," America's Community Banker, vol. 6, No. 12, 11 Sheets, Dec. 1, 1997.

Chapelle, "Merrill's Rivals Say They, Too. Offer Services Beyond Banking," Securities Data Publishing On Wall Street, 2 Sheets, Feb. 1, 2003.

Chapelle et al. "Peering Into Tomorrow: At the Threshold of a New Century, Brokers and Others Discuss Where They were Going," Securities Data Publishing on Wall Street, 6 Sheets, Dec. 1, 1999.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Hoffman, "Reserve's FDIC-Insured Account Draws Regionals; But some see little need for insurance," Crain Communications Inc., Investment News, 2 Sheets, Jun. 4, 2001.
Keenan, "Tapping Brokerages for Alternative to CDs," American Banker, The Financial Services Daily, 3 Sheets, Feb. 18, 2004.
Lavine, "Check Out High-Yield Checking Accounts," Broward Daily Business Review, vol. 39, No. 102, 2 Sheets, Apr. 27, 1998.
McReynolds, "The Power of Cash: Ho-hum cash can be great product (and lead to more business) in troubled times," Securities Data Publishing on Wall Street, 3 Sheets, Jun. 1, 2002.
McReynolds et al. "Unusual Products for Unusual Times," Securities Data Publishing on Wall Street, 6 Sheets, May 1, 2001.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking For Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
"Man Bites Dog: Funds Move Into Banking," IBC's Money Fund Selector, 2 Sheets, Nov. 6, 1998.
About iMoneyNet, Inc., About iMoneyNet's Money Funds Division, 4 Sheets, Aug. 21, 2003, http://www.ibcdata.com/about.htm.
"Reverse Ups Insurance Limit On Money Market Account," Thomson Financial Inc., Mutual Fund Market News, 1 Sheet, Aug. 26, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
The Reserve Fund, Study of U.S. Patent No. 6,374,231, 1 Sheet.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
Reserve Management Corporation, Reserve Insured Deposits, U.S. Appl. No. 76/315,600, Issued.
The Reserve, "What Sets Us Apart," 2 Sheets, Oct. 4, 2006, http://www.ther.com/bank/bank_wsua.shtml.
The Reserve, "Reserve Insured Deposits," 2 Sheets, Oct. 4, 2006, http://www.ther.com/ps/ps_fif.shtml.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
Reserve Insured Deposits, United States Patent and Trademark Office, Reg. No. 2,694,910, Registered Mar. 11, 2003, 1 Sheet.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Colleen Curran Harvey, Deputy Chief Counsel, Jan. 8, 1985; Letter From Merle Y. Waldman, Nov. 14, 1984; Letter From Merle Y. Waldman, Sep. 24, 1984; Letter From Merle Y. Waldman, Aug. 8, 1984, LEXSEE 1985 Sec No- Act., Lexis 1593, Securities Exchange Act of 1934—Section 15(a), 11 Sheets.

The Insured Savings Account, Issuer Guide to Offering MMDAs Through Merrill Lynch, Merrill Lynch Money Markets, Inc., "Operational Guide To The Merrill Lynch MMDA Program 1986", Sep. 1986 3 Sheets.
FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
Britt, Phil; "Struggling with Sweep Accounts", American's Community Banker, v6, n12, p. 18-23, Dec. 1997.
News article: "Regulators Support Demand Deposit Bill", Regulatory Compliance Watch—Mar. 9, 1998; p. 1; vol. 9, No. 10.
Blackwell, Rob, "New Pitch: Deposit Insurance Sharing", American Banker Online, Jan. 21, 2003.
ABA to Approve System for Sharing Deposit Coverage, American Banker, Feb. 11, 2003.
American Banker Online—New Pitch: Deposit Insurance Sharing, Jan. 21, 2003, pp. 1-4.
Certificate of Deposit Registry Service: Keeping deposits in the corn patch, Banknews, Mar. 2003.
Heavyweight Funding, Bankers News, Mar. 4, 2003, pp. 1-2, vol. II, issue No. 5.
Promontory Interfinancial Network: http://www.promnetwork.com/index.html, 2003.
Letter To Mr. Jonathan L. Levin, Esq., From Oliver Ireland, Associate General Counsel, Oct. 18, 1996, 2 Sheets.
Letter To Mr. L.P. Fleming, Jr., Esq., From Oliver Ireland, Associate General Counsel, Feb. 7, 1995, 3 Sheets.
Letter To Mr. James E. Creekman, Group Vice President, From Oliver Ireland, Associate General Counsel, Aug. 1, 1995, 4 Sheets.
Letter To Ms. Brenda L. Skidmore, Senior Vice President, From Oliver Ireland, Associate General Counsel, Aug. 30, 1995, 4 Sheets.
Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.
Letter From William W. Wiles, Secretary of the Board, Board of Governors of the Federal Reserve System, Jun. 22, 1983, 6 Sheets.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Letter from Michael Bradfield, General Counsel, Board of Governors of the Federal Reserve System, Nov. 16, 1984, 4 Sheets.
Board of Governors of the Federal Reserve System, 1984 Fed. Res. Interp. Ltr. Lexis 56, Nov. 16, 1984, 3 Sheets.
Letter From Oliver I. Ireland, Associate General Counsel, Board of Governors of the Federal Reserve System, Jun. 22, 1988, 5 Sheets.
Board of Governors of the Federal Reserve System, 1988 Fed. Res. Interp. Ltr. Lexis 141, Jun. 22, 1988, 3 Sheets.
Board of Governors of the Federal Reserve System, 1989 Fed. Res. Interp. Ltr. Lexis 77, Mar. 14, 1989, 2 Sheets.
Board of Governors of the Federal Reserve System, 1989 Fed. Res. Interp. Ltr. Lexis 154, Jun. 21, 1989, 2 Sheets.
U.S. Appl. No. 60/307,815, filed Jul. 27, 2001.
U.S. Appl. No. 60/323,365, filed Sep. 20, 2001.
Board of Governors of the Federal Reserve System, 1990 Fed. Res. Interp. Ltr. Lexis 94, Feb. 1, 1990, 1 Sheet.
Board of Governors of the Federal Reserve System, 1991 Fed. Res. Interp. Ltr. Lexis 232, Jan. 30, 1991, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
Board of Governors of the Federal Reserve System, 1994 Fed. Res. Interp. Ltr. Lexis 156, Jun. 24, 1994, 3 Sheets.
CMA, Insured Savings Account Fact Sheet, Merrill Lynch, Pierce, Fenner & Smith Incorporated, Jul. 1994, pp. 47-54.

Board of Governors of the Federal Reserve System, 1994 Fed. Res. Interp. Ltr. Lexis 314, Oct. 17, 1994, 2 Sheets.

Board of Governors of the Federal Reserve System, 1994 Fed. Res. Interp. Ltr. Lexis 419, Oct. 14, 1994, 4 Sheets.

CMA, The Merrill Lynch Cash Management Account Financial Service, Insured Savings Account Participating Depository Institutions, Merrill Lynch, Pierce, Fenner & Smith Incorporated, Mar. 1995, 2 Sheets.

Letter from Stephanie Martin, Assoc. General Counsel, Board of Governors of the Federal Reserve System, Apr. 22, 2004, 8 Sheets.

Bank Deposit Program, Online http://web.archive.org/web/20030620100115/http:/www.smithbarney.com/products_servi, Jan. 19, 2001, 4 Sheets.

U.S. Appl. No. 10/825,440, filed Apr. 14, 2004, Bent et al.

Announcing Changes in Automatic "Sweep" Investment Options, LPL Financial Services, Linsco/Private Ledger, Member NASD/SIPC, 26 Sheets.

Insured Cash Account Program Disclosure Booklet, LPL Financial Services, Linsco/Private Ledger, Member NASD/SIPC, 14 Sheets.

California Independent Bankers, ICBA Independent Community Bankers of America, Banker Bulletin, 2006, CIB 16th Annual Convention, vol. 4, Issue 6, http://www.cib.org/banker_bulletin.htm, 2 Shhets.

AB 2011 Assembly Bill - CHAPTERED, http://www.leginfo.ca.gov/pub/bill/asm/ab_2001-2050/ab_2011_20060925_chaptered.html, 2006, pp. 1-3.

AB 2011 Assembly Bill - ENROLLED, http://www.leginfo.ca.gov/pub/bill/asm/ab_2001-2050/ab_2011_20060816_chaptered.html, 2006, pp. 1-3.

AB 2011 Assembly Bill - HISTORY, Complete Bill History, http://www.leginfo.ca.gov/pub/bill/asm/ab_2001-2050/ab_2011_20060925_chaptered.html, 2006, p. 1.

AB 2011 Assembly Bill - BILL ANALYSIS, Senate Amendments, http://www.leginfo.ca.gov/pub/bill/asm/ab_2001-2050/ab_2011_cfa_20060811_161755_asm_floor.html, 2006, pp. 1-3.

AB 2011 Asembly Bill - BILL ANALYSIS, Senate Rules committe, Third Reading, http://www.leginfo.ca/gov/pub/bill/asm/ab_2001-2050/ab_2011_cfa_20060705_161454_sen_floor.html, 2006, pp. 1-7.

The Reserve Funds Press Release "The Reserve funds and Fronter Bank Partner to Offer Revolutionary Banking Product," 5 Sheets, Aug. 1, 2000.

* cited by examiner

SYSTEMS AND METHODS FOR PROVIDING ENHANCED ACCOUNT MANAGEMENT SERVICES FOR MULTIPLE BANKS

This application is a continuation-in-part of application Ser. No. 09/677,535, filed Oct. 2, 2000, and a continuation-in-part of application Ser. No. 10/071,053, filed Feb. 8, 2002, both of which are continuations-in-part of U.S. patent application Ser. No. 09/176,340, filed Oct. 21, 1998 and now U.S. Pat. No. 6,374,231 B1. This application also claims benefit of provisional application 60/442,849, filed Jan. 27, 2003. The entirety of the disclosure of each of these applications is incorporated herein by reference for all purposes.

1. FIELD OF THE INVENTION

The present invention provides systems and methods that deliver account management services to multiple participating financial institution (including banks) so that they may offer to their customers interest-earning, deposit accounts without withdrawal restrictions and/or with enhanced deposit insurance. This invention's management methods preferably maintain each participating financial institution's total customer funds on deposit.

2. BACKGROUND OF THE INVENTION

It would be desirable if depositors and investors could obtain fully-insured, interest-bearing accounts with an unlimited number of transactions or withdrawals per month. However, present statutory and regulatory requirements, which in the United States ("US") are generally codified as Title 12 of the United States Code ("U.S.C.") (Banks and Banking), restrict the flexibility of banks and savings institutions, and limit investors and depositors seeking investments and deposits having a lower risk profile to a rather limited selection of choices, all of which suffer inhibiting constraints.

First, Title 12 U.S.C. Chapter 3 (Federal Reserve System), along with Title 12 Code of Federal Regulations ("C.F.R.") Chapter II Part 204 (12 C.F.R. §§ 204.1-204.136) (Federal Reserve Board ("FRB") Regulation D) and Title 12 C.F.R. Chapter II Part 217 (12 C.F.R. §§ 217.1-217.101) (FRB Regulation Q), prevents certain financial institutions from paying interest on deposit accounts that permit unlimited (at least more than six) monthly withdrawals of deposited funds (known as "demand deposit accounts" or "DDAs"). More specifically, 12 C.F.R. 329.2 states that "no bank shall, directly or indirectly, by any device whatsoever, pay interest on any demand deposit". A "deposit" is any money placed into a checking account, savings account, Certificate of Deposit (CD), or the like. In a "demand" account, the owner can make an unlimited number of funds transfers to another account (having the same or a different owner), or to a third party, typically by bank drafts, checks, credit cards, and debit cards. In other words, an account in which a depositor has the ability to make six or more monthly transfers will be deemed a demand account and no interest will be payable on the funds deposited therein (unless the funds of a non-commercial entity are held in a NOW account under 18 U.S.C. 1832(a)). Owners of demand accounts are denied interest on their funds.

Second, 12 U.S.C. § 1821(a) limits government-guaranteed deposit insurance provided by the Federal Deposit Insurance Corporation ("FDIC") to a maximum coverage of $100K (K=1,000) for each owner of (or, generally, each ownership interest in) funds deposited in a single insured institution. The FDIC, created under Title 12 U.S.C. Chapter 3 (the Federal Deposit Insurance Corporation), provides insurance for deposits in most United States banks through its Bank Insurance Fund ("BIF") and in most United States savings institutions through its Savings Association Insurance Fund ("SAIF"). The rules governing insurance of deposits in institutions insured by the BIF and the SAIF are the same, and base insurance coverage on the concept of ownership rights and capacities. Funds held in different ownership categories are insured separately from each other; and funds owned by the same ownership category but held in different accounts at the same financial entity are subsumed under the same insurance coverage limit.

Banks and other savings institutions have developed several approaches, which include money-market mutual fund sweeps and re-purchase agreement ("repo") sweeps, offered by third parties in an effort to compete with those financial institutions, for example broker/dealers, who are able to offer interest on cash balances for all their customers including commercial customers by using money-market mutual funds. However, these approaches are disadvantageous in that they involve a removal of commercial customer deposits from the bank's balance sheets into the assets of the money market-mutual fund provider, and also of the deposits from FDIC protection. This disadvantage is especially burdensome for smaller banks, such as regional or local banks.

Therefore, what is needed are systems and methods for providing fully-insured (i.e., with insurance that may exceed $100,000), interest-bearing accounts with an unlimited number of transactions per month without removing net deposits from participating financial institutions. It would be especially advantageous if these systems could be readily integrated into the existing infrastructure of a bank, savings institution, credit union, or other financial institution in a manner that would minimally disrupt these institution's existing customer relationships.

Citation or identification of any reference in this section or any section of this application shall not be construed that such reference is available as prior art to the present invention. Further, headings and sub-headings are used for convenience and clarity only; they are not to be interpreted in any limiting fashion.

3. SUMMARY OF THE INVENTION

The present invention overcomes the above-identified deficiencies in the prior art by providing systems and methods that extend in a novel and advantageous manner certain prior inventions made by one or more of the current inventors. These prior inventions may be briefly summarized as follows (for the purposes of this invention only and without any imitation).

In prior application Ser. No. 09/176,340, filed Oct. 21, 1998 and now U.S. Pat. No. 6,3743,231 B1 (the "parent invention") (which is incorporated herein by reference in its entirety for all purposes) systems and methods are disclosed for managing demand accounts of multiple customers of any financial institution. That invention invests the customer account funds in a single aggregated investment account at a bank, and manages the single investment account so that the account funds invested therein earn interest and are insured, while providing for customer deposits and unlimited withdrawals by use of a wide range of financial networks and services. However, insurance for individual customer accounts is limited by the $100K FDIC maximum-coverage limit, so balances over $100,000 are not insured.

Prior application Ser. Nos. 09/677,535, 10/071,053, and 60/372,347 (which are incorporated herein by reference in its entirety for all purposes) disclose various improvements of the above invention. Prior application Ser. No. 10/071,053, filed Feb. 8, 2002, adapts the above invention to banks, especially smaller banks, that wish to retain close customer relationships and additionally do not wish their ability to make loans affected by sweeping deposited funds to a money-market mutual fund or a difficult-to-manage repurchase program (where assets must be collateralized), because deposited funds can be important as a source for funding loan demand. In that invention, systems and methods are provided that act as an agent of a bank to assist in transferring ("sweeping") funds between customer demand-deposit accounts and interest-earning, insured, investment accounts ("money market" accounts) maintained in the bank. The provided systems integrate closely with the bank's existing systems, and may optionally interface with external financial network and service systems.

Prior application Ser. No. 09/677,535, filed Oct. 2, 2000, overcomes the $100K limit on individual deposit insurance by providing systems and methods managing multiple insured investment accounts with each account held at a separate bank (or other financial institution). The invention transfers the bank-customer's funds among the separate banks so that no customer of the bank has more than $100K invested in any one of the separate banks. Deposits are managed also to earn interest while being available for unlimited withdrawals by use of a wide range of financial networks and services. Accordingly, customers of the bank with demand account balances exceeding $100K may be now covered by FDIC insurance available through multiple banks, although deposit balances exceeding approximately $100K must be transferred out of the initiating bank.

Prior application Ser. No. 60/372,347, filed Apr. 12, 2002 adds a flexible interest rate feature to the above inventions. According to this feature, a financial institution (or a bank) may pay interest on a customer account that depends on a wide range of factors, for example, on the balance in the customer account, on the total customer balance at the financial institution, on marketing considerations, and so forth.

Accordingly, the objects of the present invention include systems and methods that provide participating financial institutions with the ability to offer to customers deposit accounts an unlimited number of monthly transactions while improving upon these prior inventions.

It is an object of the invention that the funds deposited in the insured, interest-earning, deposit accounts at participating financial institutions remain on the institutions' books and available for normal business purposes, such as a source for loan funding; or in other words, that the methods of this invention maintain each participating institutions total deposited funds.

It is another object of the invention that funds deposited in the deposit accounts at participating financial institutions earn interest.

It is another object of the invention that interest may be earned on customer deposits at interest rates based on plural discrete tiers (or on a more smooth function) selected in accordance with each customer's account parameters such as current cash balance, nature of the customer-financial entity relationship, and so forth.

It is another object of the invention that funds deposited in one of the interest-earning, deposit accounts at the participating financial institutions are fully FDIC-insured, whether or not they exceed $100K.

It is another object that the systems and methods of the invention be readily integrable into the existing institutional infrastructure and have minimal impact on presently-existing customer relationships.

It is another object of the invention that its methods and system to permit customers to deposit funds into, and to withdraw funds from, an account by use of many financial instruments networks, and services, and to accept and process customer deposit/withdrawal transactions however presented, such as in periodic batches or files.

These objects are met at least in part by systems and methods that manages a novel arrangement of accounts, especially pairs of demand deposit and money market accounts holding funds from plural customer sub-accounts at the participating banks, that is particularly advantageous in view of the applicable United States banking laws and regulations. To simplify subsequent descriptions, the following paragraphs describe aspects of the banking environment of this invention and explain certain terms used throughout the description.

Concerning the banking environment, generally, relevant banking laws and regulations prohibit institutions from paying interest on deposit accounts not subject to any withdrawal restrictions whatsoever (referred to as "demand accounts," or as "demand deposit accounts" abbreviated as "DDA"), while permitting interest on deposit accounts subject to withdrawal restrictions, such as a required withdrawal notice (referred to as "savings accounts").

Nevertheless, certain deposit accounts not requiring withdrawal notice but subject to other withdrawal restrictions may still be deemed "savings accounts" capable of earning interest. For example, accounts known as money market deposit accounts ("MMDA") that do not require withdrawal notice (but may so require it at any time) are nevertheless deemed savings accounts capable of earning interest if withdrawals or transfers to third parties are limited to less than six monthly. (See 12 C.F.R. § 204.2(d)(1).). But certain types of transfers from MMDAs are exempt from this six-withdrawal limit. (See 12 C.F.R. § 204.2(d)(2).) Specifically, an unlimited number of monthly transfers may be made between an interest-earning MMDA account and a DDA account if (i) both accounts are in the same financial institution (or bank), (ii) both accounts are registered in the same name, and (iii) transfers are ordered in person, such as by messenger or other agent. An unlimited number of deposits into savings accounts or MMDAs is always allowed.

Second, the $100K FDIC insurance limitation is determined per-beneficial-ownership category per-insured institution, and is not determined on a per-account basis. For example, all ownership interests of a single person (or other entity) held in a single insured institution, whether they are held in multiple separate accounts and whether they are held in a single account pooled with the interests of others, are all aggregated for purposes of the $100K coverage limitation. Further, a person's ownership interests in separate insured institutions are treated separately, and are separately aggregated in each institution for purposes of the separate $100K coverage limitation available in each institution. (See 12 U.S.C. § 1821(a)(1)(C).) Consequently, a person's deposit coverage will not be reduced or jeopardized if it is combined with the interests of others in a single account, and may be increased if that person's ownership interests are deposited in separate or aggregated accounts in multiple institutions.

Therefore, this invention establishes and manages a pair of identically-registered accounts (referred to as a "MMDA-DDA pair") in one or all of the financial institutions (or banks) participating in an implementation of this invention. One account of each pair is an interest-earning MMDA subject to withdrawal limitations; the other account is a DDA not subject to any withdrawal limitations and therefore not interest-earning. Funds deposited in participating banks by participating customers are invested and held in the MMDAs in the participating institutions. Participating customers may be, for example, individuals, business entities, governmental entities, and so forth, because MMDA depositors may be of many organizational types. The DDA of each pair serves merely as a conduit through which to withdraw or transfer funds from (and, optionally, to) the paired MMDA. Since both accounts of each account-pair are identically registered at each participating bank, and since fund transfers from the MMDA through the paired DDA are ordered in person (by messenger or other agent), funds invested in the MMDA continue to earn interest even though they may be withdrawn through the paired DDA without restriction. In this manner, this invention achieves its objectives while comporting with the above-described banking environment.

In many embodiments, an organization entity (referred to as an "operating entity" or as an "administrator") has responsibility for the previously-described account pairs, along with other accounts maintained and managed by this invention, and for funds transfers among the accounts. In particular, the MMDA-DDA account pairs in the participating banks may registered as "administrator (or organizational name of the operating entity) as agent for designated customers." The operating entity typically will act as an agent for the participating customers and the participating banks according to agreements entered into when customers or banks become participants in implementations of this invention. The administrator (or other operating entity) may also manage and operate the systems and methods of the present invention. The administrator, or operating entity, may be structured according to the many known forms of business organization, such as proprietorship, partnership, joint venture, corporation, and the like. Also, the administrator may be a business entity independent of all participating banks, or may be a subsidiary of one of the participating banks, or may be a joint venture of the banks, Next, for convenience and clarity, the following terms used in the present specification have the following meanings. First, the term "financial institution" (and "participating financial institution") refers to institutions that may participate in the present invention by virtue of having certain preferred characteristics. One characteristic is that participating financial institutions offer accounts against which customers may make a variety of deposit and withdrawal transactions, where different types of participating institutions may offer customers different types of transactions. Another preferred characteristic is that a participating financial institution offer interest-bearing, insured MMDA-type accounts, or be associated in some fashion with a financial institution that does offer such accounts. Such MMDAs are generally offered by banks, and because the present invention manages participating customer accounts by investing their funds in one or more MMDAs, a participating financial institution derives greater benefit from the invention if it receives some value for these MMDA investments by being associated with one or more banks holding these MMDA investment accounts. In particular, banks may be participating financial institutions and receive direct benefit from the methods of the present invention by both offering customer accounts and providing MMDAs for investment, which may be available according to this invention as deposit accounts for other participating financial institutions. Also, broker/dealers, investment advisors, insurance companies, and so forth that may be participating financial institutions. Here, the funds of the customer accounts are invested in MMDAs in a bank designated by participating institution. A designated bank may not have any particular affiliation with the designating financial institution, or may be affiliated or associated in manners known in the art (for example, a corporate entity with a banking subsidiary and a broker/dealer, an insurance, or an investment advisory subsidiary, or a bank or bank holding company with a broker/dealer subsidiary, or so forth).

Therefore, generally, the term financial institution refers to all such preferred institutions with any banking association or affiliation permitted by law and regulation. However, for convenience and clarity but without limitation, the following description is often in terms of embodiments where participating institutions are banks holding both customer accounts and the investment MMDAs. If some participating customer accounts are in, for example, a broker/dealer, it is to be understood that the associated MMDA-DDA pair is held in the affiliated or associated bank. Also, where customer accounts are referred to in the banking embodiment as DDAs, it is also to be understood that in general customer accounts may also be broker/dealer accounts, investment advisory accounts, and so forth.

Customers of a participating financial institution (or bank) may individually choose whether or not one or more of their accounts at that institution will participate in the enhanced insurance and management services of this invention. Managed accounts are referred to as "participating customer accounts," of for convenience, simply as "customer accounts" or even as "customers." Without limitation, a single individual customer may have non-participating accounts at participating institutions, or may have two or more participating accounts at the same or at different participating institutions, or so forth.

Funds deposited in a participating customer account are referred to as that "customer's participating funds" or more simply as "customer's funds" or as "participating funds." Also, all participating funds held in the participating customer accounts at a single participating financial institution are referred to as that institution's "aggregate (or total) participating customer funds," and all funds held at an institution for all participating customers (not just that institution's customers) are referred to as the institutions "aggregate (or total) participating deposits."

Where attention is focused on a particular one of the participating institutions, it will often be referred to as "this institution," while the remaining participating institutions will be then referred to as the "other institutions." Further, the institution of a customer account, that is the institution at which the customer transacts business for that account, is referred to as the "primary institution" for that customer account or customer; other participating banks are "secondary banks" for that customer account or customer. Each participating customer account (or customer) has exactly one primary bank.

Commonly-available deposit insurance (for example, FDIC insurance) often limits coverage to a certain maximum for all the funds of a single ownership category in a single insured institution. It is often preferable for embodiments of this invention to limit the maximum amount of a single customer's funds held in a single institution to a "target amount" (or "target") which is less than the maximum coverage of the available deposit insurance. The target amount is often 99%, or 98%, or 95% or 90%, or other convenient percentage of the coverage limitation. In the case of FDIC insurance, a preferred target amount is 95% of the coverage limitation of $100K, or $95K; other exemplary target amounts may be $90K or $98K or $99K or other amount. Less preferably, the target amount may be 100% of the coverage limitation.

Also, the following abbreviations may be used in this specification and figures: "acct." for account; "cust." for customer; "DDA" for demand deposit account; "inst." for financial institution (such as a bank); "MM" for money market; "MMDA" for money market demand account; "xaction" for transaction.

Now, in view of the above-described banking environment, this invention's objectives are achieved as follows. Generally, the administrator (or operating entity) of an embodiment of the systems and methods of this invention provides account services to multiple participating customers (at least one) with accounts at multiple participating financial institutions (at least two). The administrator establishes and maintains in each participating bank one of the above-described MMDA-DDA account pairs and allocates and invests participating customer funds in the interest-earning MMDA accounts in amounts guided by objectives and rules selected so that objects of this invention are achieved.

A first preferred objective is to allocate and invest customer funds so that each customer has available a substantial maximum amount of deposit insurance available in each particular embodiment consistent with the practicalities of financial transaction processing. Where the available deposit insurance has fixed coverage limits in each participating institution, this objective may be achieved by a rule according to which no more than the target amount of funds (alternatively, no more than the insurance coverage limitation) is invested in each participating institution (or in an associated or affiliated institution). By the use of a target amount, the methods of this invention are able to practically provide a substantial maximum of deposit insurance for a customer. It is preferably that the target amount be as close to the coverage maximum as is consistent with practical transaction administration and processing. If full insurance coverage is not possible, because, for example, the customer account balance exceeds the coverage limitation (or the target amount) times the number of participating institutions, then excess uninsured funds are preferably kept at the customer's primary institution.

More generally, this invention's first objective is to reduce each customer's risk of loss. Preferably deposit insurance is available, and this objective is achieved by the above-described rules which fully insures a customer's deposits if possible. Where deposit insurance is not available for some or all of a customer's deposits, risk may be reduced by dividing a customer's deposits across such participating institutions that are financially independent of each other. For example, customer deposits in excess of the maximum insurance available in an embodiment of this invention, may be spread evenly across the participating institutions. Alternatively, customer deposits may be invested according to rules prescribed by the that customer. For example, the customer may provide a list of participating institutions prioritized for allocation and investment.

A second preferred objective is not to impact each participating institutions total deposited funds. A corresponding rule is that for any transfer of customer funds out of a financial institution to reduce risk of loss, there should be a substantially equal transfer of other participating funds into this institution. For example, if the customers of a participating bank have placed $100M into the program, then $100M in deposits should remain on the bank's balance sheet, whether these are deposits of the bank's own customers or of customers of other participating banks (or financial institutions). This objective is advantageous to institutions which use their deposits for important business purposes, for example, for funding loans.

Investment and allocation of participating funds may also be guided by secondary objectives which should be satisfied if possible without jeopardizing the two previous preferred objectives. One preferred secondary objective advantageous to participating institutions is to not allocate a customer's funds away from that customer's primary bank unless necessary. For example, customers accounts with balances less than $95,000 should not be allocated to other participating banks. However, meeting the primary (preferred) objectives may make meeting this secondary objective impossible in certain situations. Also, when a customer's balance cannot be fully insured, the excess uninsured funds should be retained in the primary institution. Alternatively, a secondary objective advantageous to customers is to reduce risk by allocating a customer's deposits substantially equally among all independent participating institutions.

In preferred embodiments the allocation and investment processes carry out the invention's objectives with both reasonable accuracy and efficiency by acting in a transaction-by-transaction fashion. Customer funds may be allocated to reduce risk on a transaction-by-transaction basis, with each customer transaction being allocated to a single institution (which may be the primary institution). Transactions are customer withdrawals and deposits of all kinds. To maintain the integrity of each institution's total deposits, the present invention may itself initiate transfer of customer funds between institutions. Most preferably, part of all of customer's funds in one institution may be transferred to another institution. In this preferred embodiment, each institution's deposits can be exactly maintained. Invention processing preferably occurs on a regular basis, for example, on an hourly, or a daily, or a weekly basis, and the like, but the invention is not so limited. In most embodiments, it is expected that processing is performed each business day.

In a preferred embodiment, investment of customer funds to reduce risk is coupled to transferring funds between institutions to preserve total deposits, and both are triggered daily to process the batch of customer transactions received for that day. For example, as each customer transaction is processed, it is assigned to the customer's composite account, which represents all transactions that have posted to the client's account. After being posted to the composite accounts, transactions are then allocated to a selected sub-account, each sub-account being associated with one participating bank and representing that portion of the customer's funds in that participating bank. If this assignment would cause that customer's allocated funds to exceed the target amount in that participating bank, then the transaction is assigned to a sub-account associated with another participating bank in order to maintain or maximize deposit insurance for that customer. After all transactions have been assigned, funds are re-allocated between banks without compromising the customers' deposit insurance so that each bank's total participating deposits equals the total participating deposits of its own customers. Preferably, customer funds are re-allocated only between secondary banks, and are not transferred out of the customer's primary bank.

The methods of this invention are performed by systems including such data processing components and facilities as are understood in the art to be necessary or preferred for performing such financial methods. These system receive and post customer transactions, allocate and invest customer funds in participating institutions, issue commands and requests to cause funds transfers among institutions, including in person requests to move funds from a MMDA in a participating (or affiliated or associated) bank to its paired DDA, and track and store records for transactions, fund transfers, and fund allocations in a database.

These system preferably inter-operate with financial systems of the participating institutions for the exchange of necessary data and commands, and may inter-operate differently with different institutions. Generally, inter-operation with institutions may be arranged in one of two configurations. In a first configuration known as a sweep-type arrangement, the systems of this invention inter-operate on the behalf of a participating institution's customers primarily with the systems of that institutions alone (and not with external systems). The institution's own systems then interface to external payment and funds transfer networks on the behalf of its customers, collect their transactions, settle transaction with the external networks, and then provide participating customer transactions to systems of this invention, for example, as daily transaction files. The systems of this invention then receive, allocate, and invest transactions for the institution's participating customers, and inter-operate with the institution's systems to cause funds transfers between the institution and the other participating institutions to preserve deposit positions.

In one variation of this configuration, the institution maintains its own accounts (for example, DDA accounts) for participating customers with minimum balances targeted to cover customers' observed and expected deposit and payment patterns. For example, the target minimum balance may be a percentage based on past account use of the total balance. Customer account funds in excess of these target minimum balances are swept to and from the systems and accounts of this invention for management by the methods of this invention.

In a second configuration, the systems of the present invention take a more active role in the management of participating customer accounts at a participating institution. Here, this invention's systems directly interface to external payment and funds transfer networks on behalf of the institution's participating customers and collect customer transactions. These systems may then settle on the behalf of the institution with some or all of the external financial networks, or assist the institution to do so, and will thereby directly accumulate daily customer transaction files for allocation and investment among the participating (or affiliated or associated) banks.

Also institutional systems and the system of this invention may inter-operate in overlapping configurations. The participating institution may collect and settle transactions with some external financial networks, while the invention performs these functions with other financial networks. Here, transaction files from the institution may be merged with transaction files accumulated by this invention's systems prior to funds allocation. This invention may inter-operate with different participating institutions in the same embodiment according to either configuration.

4. BRIEF DESCRIPTION OF THE FIGURES

The present invention may be understood more fully by reference to the following detailed description of the preferred embodiments of the present invention, illustrative examples of specific embodiments of the invention and the appended figures in which.

5. DETAILED DESCRIPTION OF THE PREFERRED EMBODIMENTS

Preferred embodiments of the methods and systems of the invention summarized above are next described. Although the following description is primarily directed to embodiments where the participating financial institutions are banks, the participating financial institution may be non-banks (e.g., broker/dealers, investment advisory firms, and so forth) that are associated or affiliated with a bank as described above. Also, although customer accounts may be described as DDA accounts, it is understood that customer accounts may also be at non-banks and then may have characteristics different from DDAs in banking institutions.

Account Structures in the Preferred Embodiments

Figure 1:
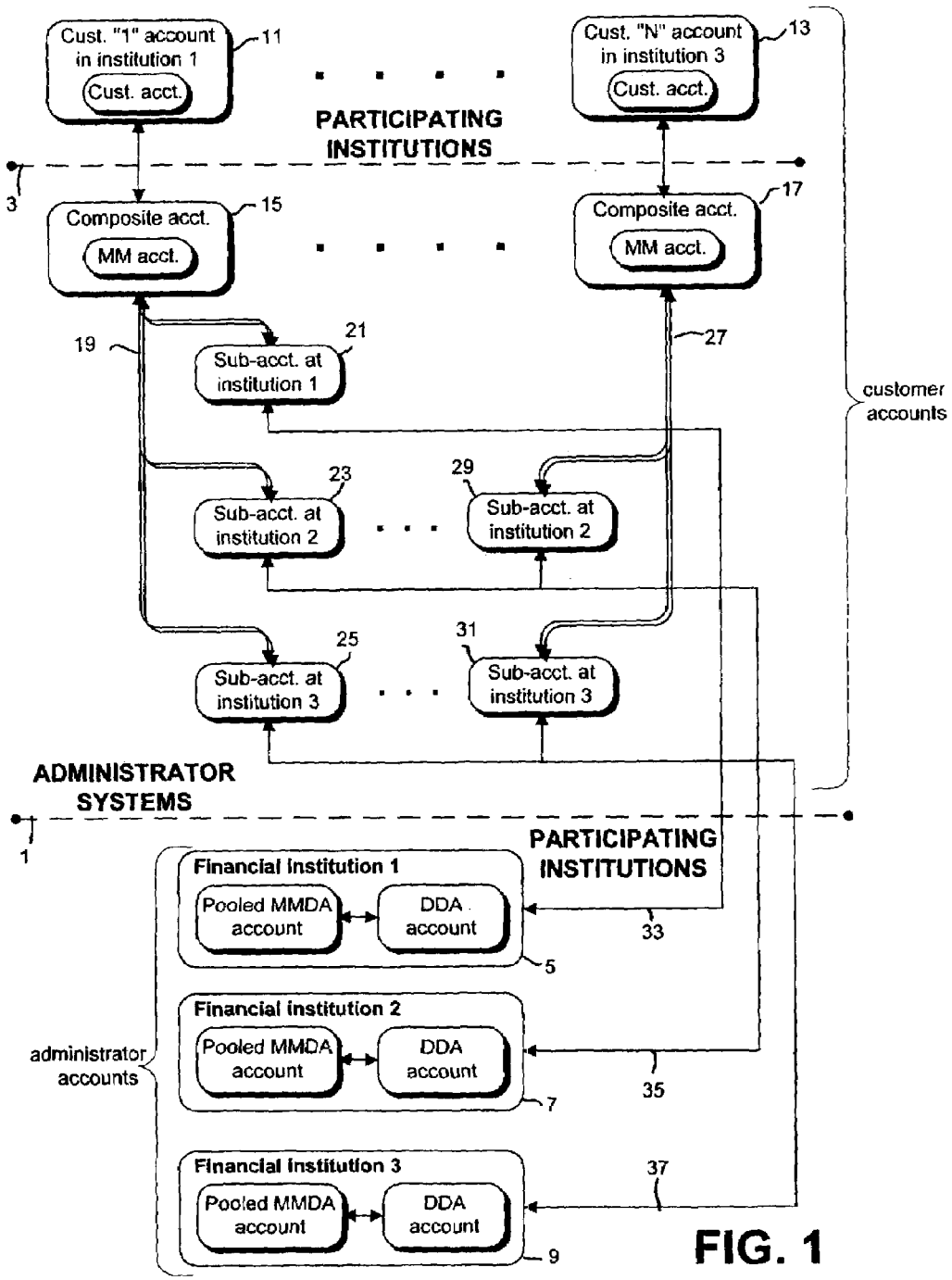
FIG. 1 illustrates exemplary account structures maintained by this invention.

In preferred embodiments, the present invention establishes and maintains linked administrator and customer accounts in order to efficiently perform its processing. FIG. 1 illustrates exemplary account structures for a number, N, of customers at three financial institutions.

In particular, the accounts above separator line 3 represent for customers who are participating in this invention their managed accounts at their primary participating financial institutions. Accounts displayed between separator lines 1 and 3 are registered or related to specific customers at the participating institutions, are used by the administrator according to the methods of this invention to manage the customer's participating funds. Records for these accounts are stored in this invention's databases (also referred to as the "administrator databases"). Specifically, a customer's composite account (one only) represents that customer's total funds managed by this invention, while each sub-account of a customer's (one or more) represents the portion of that customer's managed funds held in the participating financial institution associated with the sub-account, where each sub-account is associated with one participating financial institution.

Finally, accounts displayed below separator 1 are registered to the administrator (or operating entity) of an embodiment as agent for the participating customers ("administrator accounts"). These accounts are each in a bank associated with one participating financial institution, which holds the actual funds represented by the account, and are managed by the administrator according to the methods of this invention. Records for these accounts are also stored in the administrator's databases. Funds of all the customer sub-accounts associated with each participating institution are held by the administrator (as agent for the customers) in the administrator accounts in the associated or affiliated banking institution. (Where the participating institutions are banks, the bank is its own "associated" institution.) Although the present description focuses on embodiments with one or two administrator accounts per participating financial institution, in other embodiments the administrator may maintain a number of such accounts in each institution as is convenient.

Considering first the administrator accounts (below separator line 3), this invention establishes and maintains in each participating financial institution (or its associated banking entity) an interest-earning and insured MMDA account paired with a corresponding coupled DDA, the latter without withdrawal restrictions. The MMDA and DDA of each account pair are identically registered in each participating (or associated or affiliated) bank, for example as "Administrator as Agent for the Designated Customers" (or "Operating_entity_name as Agent for the Designated Customers," or a name with equivalent legal effect). FIG. 1 illustrates MMDA-DDA account pairs 5, 7, and 9 held the in three separate participating financial institutions, institutions 1, 2, and 3.

As described above, participating customer deposits are invested (or held) in the MMDAs at the various participating banks where they earn interest until needed to settle customer payments. Each MMDA will usually hold participating funds for a plurality of customers (a "pooled" MMDA). When funds are withdrawn from an MMDA to settle customer payment transactions, this invention, first, generates instructions for a messenger (or other similar person or agent) to request in-person transfer of the funds from the MMDA to the coupled DDA, and second, automatically transfers the funds from the DDA. Funds may be directly deposited into the MMDAs of each account pair, or funds may be indirectly deposited into an MMDA through its coupled DDA.

Thus, for example, to withdraw funds from the pooled MMDA account of pair 9, a messenger is instructed to request financial institution 3 to transfer selected funds from that MMDA to its identically-registered, coupled DDA. Once in the DDA of pair 9, funds may be automatically (that is electronically) withdrawn as necessary. The embodiment of FIG. 1 deposits funds into MMDAs through the coupled DDAs.

Turning next to the customer-related accounts (above separator line 3), FIG. 1 indicates schematically (by " . . . ", a notation used elsewhere in FIG. 1) a plurality of participating, original accounts owned by a plurality of N customers, which are distributed among the three financial institutions. Only two exemplary participating original accounts, original customer account 11 for customer 1 of financial institution 1 and original customer account 13 for customer N of financial institution 3, are explicitly illustrated. Where the participating institution is a bank, the original customer accounts may configured according to various regulatory possibilities, but typically will be a demand deposit account (DDA) without withdrawal limitations that the customer uses to make payments and to receive deposits. Where the participating institution is not a bank (but is associated or affiliated with a bank at least for the purposes of this invention), the original customer accounts will be appropriate to that institution (e.g., a broker/dealer, investment advisory firm, a insurance company, or other type of financial institution offering customer accounts).

Participating funds (funds that actually participate in the methods of this invention) from each participating (original) customer account is accounted for by a single composite account, which represents total managed funds of that customer wherever the funds are currently deposited/invested. Further, each single composite account will have one or more attached sub-accounts, which represent that customer's funds actually held at the various participating (or affiliated or associated) banks. FIG. 1 (between separators lines 1 and 3) explicitly illustrates composite account 15, representing participating funds from customer account 11, and composite account 17, representing participating funds from customer account 13. Typically, all the funds in a customer's original account will participate in and be managed by this invention. Alternatively, a certain percentage or dollar amount of customer funds may be retained in the customer's original account in the original financial institution in order to settle transactions arising between the periodic funds-allocation processing of this invention. This percentage or amount may be determined automatically based on the history of a customer's original account, or may be set by the customer, or may be otherwise determined.

Composite accounts represent both a customer's total funds participating in this invention, and also by means of sub-accounts they also represent the allocation and investment of a customer's participating funds in the MMDA-DDA pairs maintained in the participating financial institutions. In the preferred embodiments, this allocation and investment is represented by one or more sub-accounts (and stored sub-account data) that are conceptually part of each composite account. In other words, if funds of a composite account have been allocated to and invested in the MMDA-DDA pair maintained in a particular financial institution, then that composite account will have a separate sub-account representing this allocation and investment. Because a customer's funds are preferably invested in the customer's original financial institution to the extent possible, each composite account will have a sub-account (referred to as the "primary" sub-account) representing allocation and investment in the primary institution. Where a customer's funds are invested in two or more financial institutions, the composite account will have in addition to its primary sub-account one or more secondary sub-accounts representing investments in the secondary financial institutions. In all cases, the sum of all sub-account balances will equal the balance of the parent composite account.

For example, FIG. 1 illustrates that composite account 15 for client 1 includes 19 three sub-accounts: primary sub-account 21 represents customer 1's funds that are allocated 33 to MMDA-DDA pair 5 in financial institution 1; secondary sub-account 23 represents funds allocated 35 to account pair 7 in financial institution 2; and secondary sub-account 25 represents funds allocated 37 to account pair 9 in financial institution 3. Sub-account 21 is primary because financial institution 1 is customer 1's original and primary institution, while sub-accounts 23 and 25 are secondary. Customer 1 has three sub-accounts to provide deposit-insurance coverage because the composite account balance is between two and three time the deposit-insurance target amount (for example, between $190-285K). Next, for customer N, composite account 17 includes 27 two sub-accounts: secondary sub-account 29 representing funds allocated 35 to financial institution 2; and primary sub-account 31 representing funds allocated 37 to financial institution 3. Customer 2's sub-accounts provide deposit insurance coverage for balances between the target amount and twice the target amount (for example, between $95-190K).

This invention may assign to each participating bank a unique code that is then used to identify the primary bank to which each composite and sub-account belongs.

Funds Allocation Processing in the Preferred Embodiments

Using this account structure, preferred methods for allocating participating customer funds among the participating banks are now described, commencing with the rules and objectives which guide funds allocations and followed by a preferred implementation of these rules and objectives.

Participating customer funds are generally invested according to a process which implements a number of rules in order to satisfy to the extent possible the goals and objectives of this invention. These rules are generally divided into primary rules and secondary rules. It is highly preferable that any allocation of participating funds always satisfy the primary rules. However, depending on the number of customers, the size of their participating funds, their primary banks, and so forth, no allocation of participating funds may be possible which satisfies both the primary and the secondary rules. In these situations, it is preferred that the secondary rules be satisfied to the extent possible.

In preferred embodiments, funds investment or allocation is guided by two (a first and a second) primary allocation rules and by one or more secondary allocation rules. The first primary rule, advantageous to participating customers, is to allocate a customer's participating funds among the MMDA-DDA pairs in order that the customer receives the maximum possible deposit insurance. This is achieved by never allocating a customer's participating funds so that a bank has more than the target amount when another bank is allocated less than the target amount. If the total amount of a customer's participating funds is equal to or less than a maximum insurance threshold, which is equal the target amount (or less preferably, the actual FDIC-maximum-coverage amount) times the number of participating banks, then all that customer's funds can be covered by deposit insurance. In the contrary case, where a customer's participating funds exceed the maximum insurance threshold, then one or more banks must hold more than the target amount of that customer's funds. In both cases, this first primary rule allocates funds so that the each customer's deposit insurance coverage is maximized.

The second primary rule is to allocate all participating funds so that each bank has on deposit an aggregate amount of funds equal to that bank's participating funds, whether or not the deposited funds are owned by customers of that bank. Stated differently, the total of the funds of all participating customers at a participating bank is considered herein as that bank's aggregate or total participating funds. If the funds of one or more customers must be transferred to other participating banks for insurance coverage according to the first primary rule, then according to this second primary rule an equal amount of funds should be transferred from other banks to this bank in order to maintain this bank's aggregate funds on deposit. This rule is advantageous to participating banks, especially smaller banks, because a bank's aggregate deposits can be sources of income, for example, by being available for loans.

Processing of these primary allocation rules by the methods of this invention provides participating banks with the ability to provide increased FDIC insurance over the $100,000 coverage limits to their bank and/or brokerage customers by allocating and investing their participating customer's balances in excess of $95,000 (or other target amount) in interest bearing deposit accounts at other banks. The bank does not lose deposits held on its balance sheet, since it receives reciprocal deposits, equal to deposits transferred out, transferred in from other banks participating in this invention. For example suppose bank A has a customer account with a balance of $300,000. Because FDIC Insurance covers only the first $100,000 of this balance, by dividing the additional $200,000 equally between bank B and bank C, bank A can provide this customer with full FDIC coverage. Since bank A does not want to lose the $200,000 in deposits, the methods of this invention will transfer to bank A $200,000 in deposits from other participating banks (perhaps, but not necessarily, banks B and C).

Because for non-bank participating institutions the original customer accounts may not be insured, this invention permits these institutions to offer deposit insurance for (some or all) of their customer accounts for the first time. Similarly, this invention provides the participating institution's affiliated or associated bank with total deposits equal to the managed funds from the participating institution. Thereby both affiliated or associated institution benefit.

One preferred secondary rule aims to never transfer customer funds unless necessary to meet the first two primary rules. For example, it is preferred not to transfer funds for a customer who has less that the target amount (for example, $95K) of funds on deposit. Also, a customer's funds that exceed the maximum insurance coverage provided by this invention (which equals the target amount times the number of participating banks) should remain in that customer's primary bank. Even though situations may arise where this rule cannot be met for all customers, a preferred allocation method will satisfy this rule for many of the participating customers.

Another preferred secondary rule is that it is preferable for customers of a bank to earn the rate of return specified by the primary bank regardless of which other participating banks hold these customers' funds. This rule may be simply satisfied by allocating the interest earned on investments in each bank's MMDA account to the customers of that bank, wherever their deposits are allocated. Since the allocation methods provide each bank with aggregate total deposits equal to the aggregate total deposits of its participating customers, the total amount of interest it pays will be the equal the amount of interest it would have paid if no participating customer funds had been transferred from the bank. By allocating this amount of interest among its customers in its normal fashion, all these customers will receive their specified and expected rate of interest. Accordingly, it is preferable for participating banks to retain interest earned on their respective MMDAs and to allocate this interest to their own customers.

Aspects of these allocation rules can be illustrated by the following example having two participating banks, Bank A and Bank B, presented in Tables 1-4. Table 1 illustrates hypothetical balances for both banks prior to the allocation processing of this invention according to which Bank A (B) has $100M ($50M) deposited in participating accounts and these account have $12M ($9M) of balances in excess of the preferred insurance-coverage target amount of $95K.

TABLE 1

| TOTAL | Bank A | Bank B |
| --- | --- | --- |
| Participating deposits | $100M | $50M |
| Balances $0-95K | $88M | $41M |
| Balances $95-190K | $12M | $9M |

Table 2 restates the data of Table 1 in a format identifying at each bank the source of deposits. Table 2 illustrates that before allocation processing, Bank A (B) holds deposits of only Bank A's (B's) own customers.

TABLE 2

| TOTAL | Bank A | Bank B |
| --- | --- | --- |
| Aggregate deposits | $100M | $50M |
| Accounts with balances $0-95K | | |
| Cust. of Bank A | $88M | 0 |
| Cust. of Bank B | 0 | $41M |
| Accounts with balances $95-190K | | |
| Cust. of Bank A | $12M | 0 |
| Cust. of Bank B | 0 | $9M |

In order that the participating customers are fully covered by deposit insurance (the first primary rule), all account balances over $95K must be moved out of their primary bank to a secondary bank. Table 3 (in rows six and seven) illustrates this reallocation of $12M ($9M) of deposits of Bank A's (B's) customers to the MMDA in Bank B (A). Although all customers are now insured, Bank A's total aggregate deposits of $97M are less than its total participating deposits of $100M, and Bank B's total aggregate deposits of $53M exceed its total participating deposits of $50M. In order words the second primary rule is not met.

TABLE 3

| TOTAL | Bank A | Bank B |
|---|---|---|
| Aggregate deposits | $97M | $53M |
| Accounts with balances $0-95K | | |
| Cust. of Bank A | $88M | 0 |
| Cust. of Bank B | 0 | $41M |
| Accounts with balances $95-190K | | |
| Cust. of Bank A | 0 | $12M |
| Cust. of Bank B | $9M | 0 |

Therefore, to satisfy the second primary rule, $3M must be transferred from Bank B to Bank A. Since no funds from accounts with balances over $95K (all from Bank A's customers) may be transferred without some of these Bank A customers losing insurance coverage, $3M in funds from accounts with deposits less than $95K (all from Bank B's customers) must be transferred. Table 4 (in row 4) illustrates the final allocation meeting both primary rules.

TABLE 4

| TOTAL | Bank A | Bank B |
|---|---|---|
| Aggregate deposits | $100M | $50M |
| Accounts with balances $0-95K | | |
| Cust. of Bank A | $88M | 0 |
| Cust. of Bank B | $3M | $38M |
| Accounts with balances $95-190K | | |
| Cust. of Bank A | 0 | $12M |
| Cust. of Bank B | $9M | 0 |

In this example the secondary rule is violated. Certain customers of Bank B whose accounts have a balance less than $95K must have funds transferred from their primary bank even though this is not preferred. Due to a greater need for increased deposit insurance coverage by Bank A, certain Bank B customers that do not require increased deposit insurance have had their accounts transferred to Bank A in order to meet the two primary objectives.

Now the preferred processes implementing these rules and objectives will be described. Generally, these processes perform funds allocation in a manner that sufficiently approximates an exact solution to the rule-constrained funds allocation problem; preferably, the funds allocation satisfies exactly the allocation rules. The allocation process is usually performed on a regular basis with a frequency determined by characteristics the participating customers and financial institutions. In the case of retail customers of banks and similar institutions, allocation processing is preferably performed on a daily or twice-daily basis during the business week. In situations where customer transactions are relatively infrequent, processing may be performed weekly or monthly. In other situations where typical customer transactions are comparable to the size of the target amount, then more frequent, even transaction-by-transaction processing, processing may be advantageous.

Figure 2:
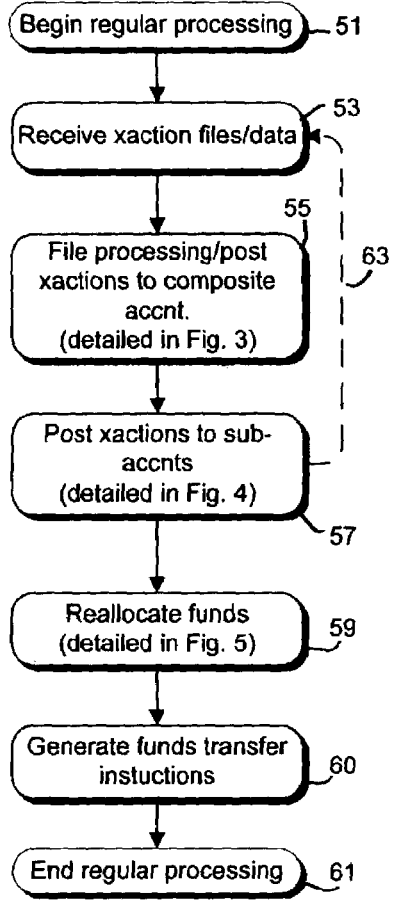
FIG. 2 illustrates periodic processing performed by this invention.

FIG. 2 illustrates in outline a preferred embodiment of regular processing, however frequently performed. After regular processing is triggered and commences 51, its first activities are to receive transaction data for customer transactions that have occurred since that last regular processing 53. These transactions will in most cases require funds reallocation because customer balances are changed. Transactions may be received from the participating financial institutions, usually in batches such as transaction files. Alternatively, transaction may be received directly by the methods and system of this invention from external transaction sources, such as payment and funds transfer networks, and stored in batches or files for later processing. Once transaction batches or files have been received for all participating customers, they are initially processed 55 and applied to customer composite accounts stored in system databases.

Steps 57 and 59 are the heart of the regular funds allocation process. Step 57 first posts all received customer transactions to customer composite accounts, and then allocates the posted transactions to customer sub-accounts in a manner that provides full deposit-insurance coverage (or a maximum of coverage if full coverage is not possible). After step 57, although the first primary rule is satisfied, the second primary rule may not be satisfied: one or more individual participating institutions may have total aggregate deposits that are more or less than the participating deposits of the own customers (referred to as "out of balance"). Accordingly, step 59 reallocates funds in customer sub-accounts among the participating institutions to insure that the institutions are brought into balance. After transaction allocation processing of step 57 and sub-account re-allocation processing of step 59, instructions are generated 60 and transmitted to cause transaction settlement and funds transfer between participating institutions. Regular processing terminates at step 61.

In alternative embodiments, the principal steps, receiving transaction data, allocating transactions, and re-allocating sub-account funds, may be performed in different orders. For example, if the participating institutions may tolerate being out of balance to a certain degree, then receiving transaction data and allocating transactions may be repeatedly performed 63 in a regular fashion as above while sub-account-fund reallocation is performed only when the out of balance condition exceeds the tolerable degree.

Figure 3:
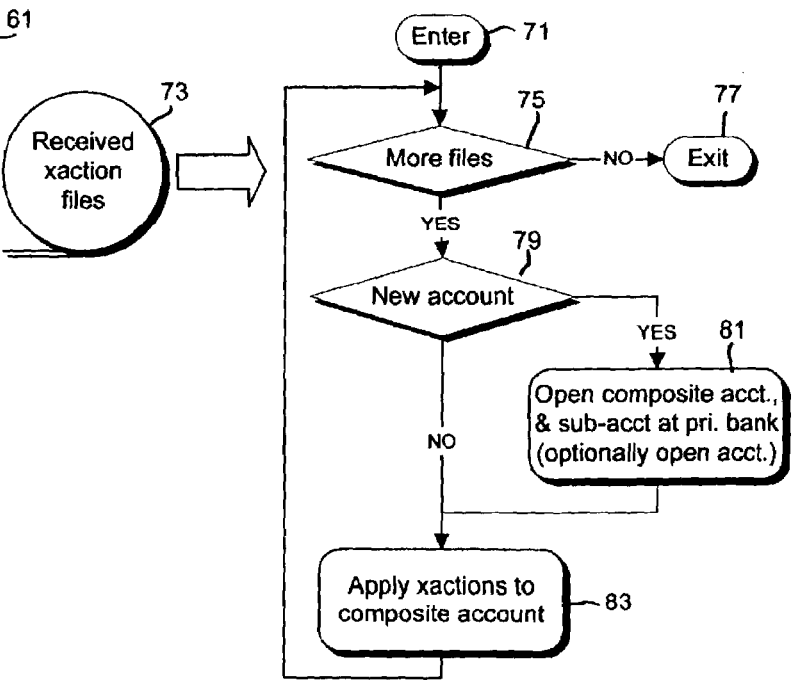
FIG. 3 illustrates file-processing steps of the periodic processing of this invention.
Figure 4:
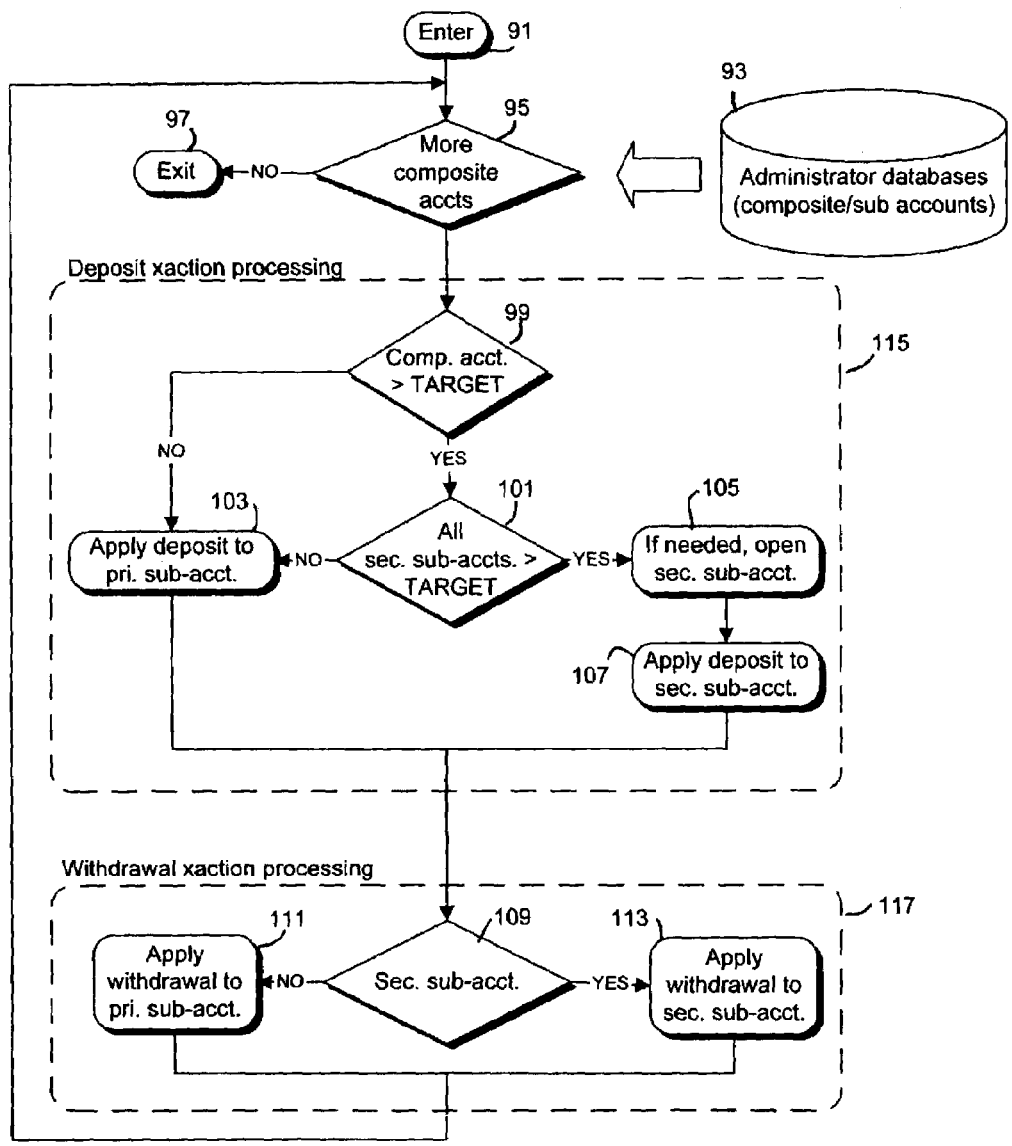
FIG. 4 illustrates post-to-sub-account steps of the periodic processing of this invention.

Next, these individual processing steps illustrated in FIG. 2 will be described in more detail with reference to FIGS. 3, 4, and 5. First, FIG. 3 illustrates file processing step 55 in more detail. This processing commences at step 71, and directly tests 75 for further transaction files 73 to process. If all received transaction files have already been processed, file processing exits 77. Otherwise, file processing tests 79 whether the input data relates to the opening (or availability) of a new participating customer account. If so, the appropriate data structures necessary to manage this account are opened and initialized 81 in the invention's databases. The new data structures include, at least, a new composite customer account and at least one primary sub-account. Secondary sub-accounts may also be opened and initialized at this time if desired. Also, if the new account indication has been received directly by the administrator, it may be necessary to open directly or indirectly a new customer account with the primary financial institution. Otherwise, if the input data relates to daily customer transactions, then these transaction are applied 83 to the customer composite accounts stored in the invention's databases. Transaction are applied or posted in a standard manner as known in the art by recording transaction details in appropriate ledgers along with current balance updates.

After received transactions are applied 55 (FIG. 2) to composite accounts stored in the administrator database, they are allocated and posted to 57 the customer sub-accounts, the balances of which indicate the amount of a customer's funds in each participating institution. FIG. 4 illustrates transaction allocation processing in more detail. After this processing commences at 91, it tests for another unprocessed composite account 95 present in administrator database 93 and processes it if one is present; otherwise transaction allocation processing exits 97. All composite accounts in the administrator database are thereby processed. As illustrated, preferred allocation processing is generally divided into two parts, a first part which processes deposit transactions (or other types of transactions that increase customer composite account balances) 115 followed by a second part which processes withdrawal transactions (or other types of transactions that decrease customer composite account balances) 117. In alternative embodiments the processing order of deposit and withdrawal transactions may be reversed; further, the processing of deposit and withdrawal transactions may be interleaved in the order in which they are retrieved from the composite account.

Deposit transaction processing 115 generally seeks to add new deposits to a customer's primary sub-account in the customer's primary institution if consistent with maximum deposit insurance. Otherwise, new deposits are added to secondary sub-accounts to achieve maximum deposit insurance. Therefore, the existing balance in a customer's composite account (or in the customer's primary sub-account) is tested 99. If the existing balance plus the new deposit will not exceed the target coverage amount, then processing branches to the left at test 99, and the new deposit may be allocated 103 to the customer's primary sub-account. On the other hand, if the existing balance in the primary sub-account plus new deposit exceeds the target coverage amount, processing proceeds to test 101, where the customer's secondary sub-accounts are tested to determine if there is at least one secondary sub-account with an existing balance so that after adding the new deposit to the existing balance the sub-account will remain within the target amount. If there is at least one such secondary sub-account, processing branches at test 101 to the right, and the new deposit is allocated 107 to that sub-account. Also, this right-hand branch is taken where, although all existing secondary sub-accounts are too near the target amount, there exists another secondary institution not yet having a secondary sub-account for this customer. Then, a new secondary sub-account may be opened 105 in that secondary institution and the new deposit may be allocated 107 to that new sub-account.

Further, it may happen that a customer has secondary sub-accounts at all secondary institutions none of which are capable of receiving the new deposit without exceeding the target coverage amount. In this case, in those embodiments where it is preferred to retain a customer's deposits in the customer's primary institution, the left-hand branch from test 101 is taken, and the new deposit is allocated 103 to the primary sub-account. On the other hand, in those embodiments where it is preferred to distribute a customer's excess balance (over the target amount times the number of participating financial institutions) among the secondary institutions (or banks) to reduce risk, processing will branch from test 101 to allocate the new deposit to that secondary sub-account 107 having the smallest existing balance or to the primary sub-account 103 if that account has the smallest current balance.

Withdrawal transaction processing 117, conversely to deposit processing, generally seeks to remove funds from a customer's secondary financial institutions so that the customer's primary institution holds the most customer funds consistent with maximum deposit insurance coverage. Accordingly, withdrawal processing tests 109 if the customer has any secondary sub-accounts with balances sufficient to satisfy the new withdrawal transaction. If so, processing branches to the right at test 109, and the withdrawal is posted 113 to that secondary sub-account. Where even distribution of a customers excess balance evenly among the secondary institutions (or banks) is preferred, new withdrawals may be allocated to the secondary sub-account with the largest balance. Further, if no single sub-account has a sufficient existing balance to cover a new withdrawal, as much as possible of the withdrawal may be covered from two or more (or all) sub-accounts. In this case, one or more (or all) sub-accounts may have be left with zero balances. If the withdrawal cannot be satisfied by reducing all sub-accounts to zero balance, the remainder can be covered by branching to the left and withdrawing funds 111 from the primary account.

Finally, it is often advantageous to split both deposit and withdrawal transactions among sub-accounts, allocating part of a transaction amount to one sub-account and part to another sub-account. For example, this may be guided in order to achieve a better distribution of a customer's excess balances among the secondary sub-accounts or to maximize funds (preferably within the target amount) in the customer's primary sub-account.

Generally, although transaction allocation as described achieves the deposit-insurance-coverage objectives of this invention, it may leave the participating banks or financial institutions out of balance. The second primary objective is that each participating bank be in balance, that is where with the total aggregate of the deposits allocated to each bank equals the total participating deposits of the customers of that bank. The total deposits allocated to a bank equals the sum of the balances of all sub-accounts allocated to and held by that bank, whether or not the sub-accounts are associated with customers of that bank; the bank's total participating funds equals the sum of the balances of the composite accounts of all the customers of that bank. It is convenient in the following to use the term "net_difference" to stand for the difference of these two sums, namely, the sum of the composite account balances subtracted from the sum of the balances of the allocated sub-account balances. Then a bank is said to be in surplus if its net_difference is positive; a bank is in balance if its net_difference is substantially zero; and a bank is in deficit if its net_difference is negative.

The following example, including three banks, Bank A, Bank B, and Bank C and presented in Tables 5-7, illustrates that the results of transaction allocation may lead to need for funds re-allocation. First, Table 5 illustrates exemplary results of a just-completed transaction allocation for the present processing period. (Parenthesis enclosing an amount indicates that the amount is negative.) Here, Bank A started with $100M in aggregate total deposits as of the end of the previous regular processing. Bank A's transaction file for the current processing day is equal to $8M. Therefore, it has increased its aggregate deposit balances by $8M. The transaction allocation for the present processing period leads to a net of $8M in new deposits allocated to all the sub-accounts held at Bank A. Of this $8M of new net deposits, customers of Bank A have generated a net of $8M of new deposits; customers of Bank B have generated $2M of net withdrawals; and customers of Bank C have generated $2M of new deposits. These nets are consistent because $8M=$8M−$2M+$2M. Therefore, Bank A's net difference is zero. The data for Banks B and C are similarly interpreted. Note that the transactions allocated and posted to the sub-accounts held at a specific bank may or may not be in the transaction file sent by that bank, since not all sub-accounts held at the bank are for customers of the bank.

TABLE 5

|  | BANK | | |
| --- | --- | --- | --- |
|  | A | B | C |
| Bank deposits as of the previous day | $100M | $50M | $30M |
| Net transactions allocated to bank from all received transaction files | $8M | $6M | $3M |
| Breakdown of net transactions by customers of bank | A = $8M; B = ($2M); C = $2M | A = ($2M); B = $6M; C = $2M | A = $2M; B = ($1M); C = $2M |

Next, Table 6 presents that same data as Table 5 organized by the customers of each bank instead of by bank.

TABLE 6

| Customers of BANK | Total net transactions of bank customers | Net transactions in sub-accounts allocated to BANK | | |
| --- | --- | --- | --- | --- |
|  |  | A | B | C |
| A | $8 M | $8M | ($2M) | $2M |
| B | $3 M | ($2M) | $6M | ($1M) |
| C | $6 M | $2M | $2M | $2M |
| Total net transactions for sub-accounts allocated to this bank |  | $8M | $6M | $3M |

For example, customers of Bank B have generated a net deposit of $3M, which results in an increase of the sum of their composite accounts by this amount. This net represents $2M of net withdrawals from Bank-B's secondary sub-accounts that are held at Bank A, $6M of net deposits in Bank-B's primary sub-accounts held at Bank B, and $1M of net withdrawals from Bank-B's secondary sub-accounts that are held at Bank C. Again, these nets are consistent because $3M=−$2M+$6M−$1M. The data for customers of Banks A and C are similarly interpreted Finally, Table 7 illustrates determination of the surplus/deficit status of the participating bank and the funds re-allocation needed (assuming the banks were all initially in balance). For example, Bank C has experienced a $3M increase in aggregate participating deposits, because $3M in customer transactions were allocated to it as indicated in Table 5. However, Table 6 indicates that the customers of Bank C generated $6M in net deposits. Therefore, Bank C has a negative net_difference, or deficit, of $3M; $3M needs to be transferred into Bank C from Banks A and B so that its aggregate deposits equals the aggregate deposits of its customers. Similar interpretation of the results for Banks A and B indicate that Bank A remains in balance while Bank B has a positive net difference, or surplus, of $3M. All the banks will be in balance again after a funds transfer of $3M from Bank B to Bank C.

TABLE 7

| BANK | A | B | C |
| --- | --- | --- | --- |
| Aggregate bank deposits on previous day | $100M | $50M | $30M |
| Change in sub-accounts attached to the bank at end of this day (= net transactions allocated to this bank) | $8M | $6M | $3M |
| Change in aggregate deposits of all customers of this bank (= net transactions of all customers of this bank) | $8M | $3M | $6M |
| Status (net_difference) | Balanced | Surplus of $3M | Deficit of $3M |
| Re-allocation needed | $0 | ($3M) | $3M |

In summary, funds re-allocation is usually needed because the net transaction balances allocated to a bank usually does not equal the net transaction balances of the bank's customers (or customers of its affiliated or associated participating financial institution).

Figure 5:
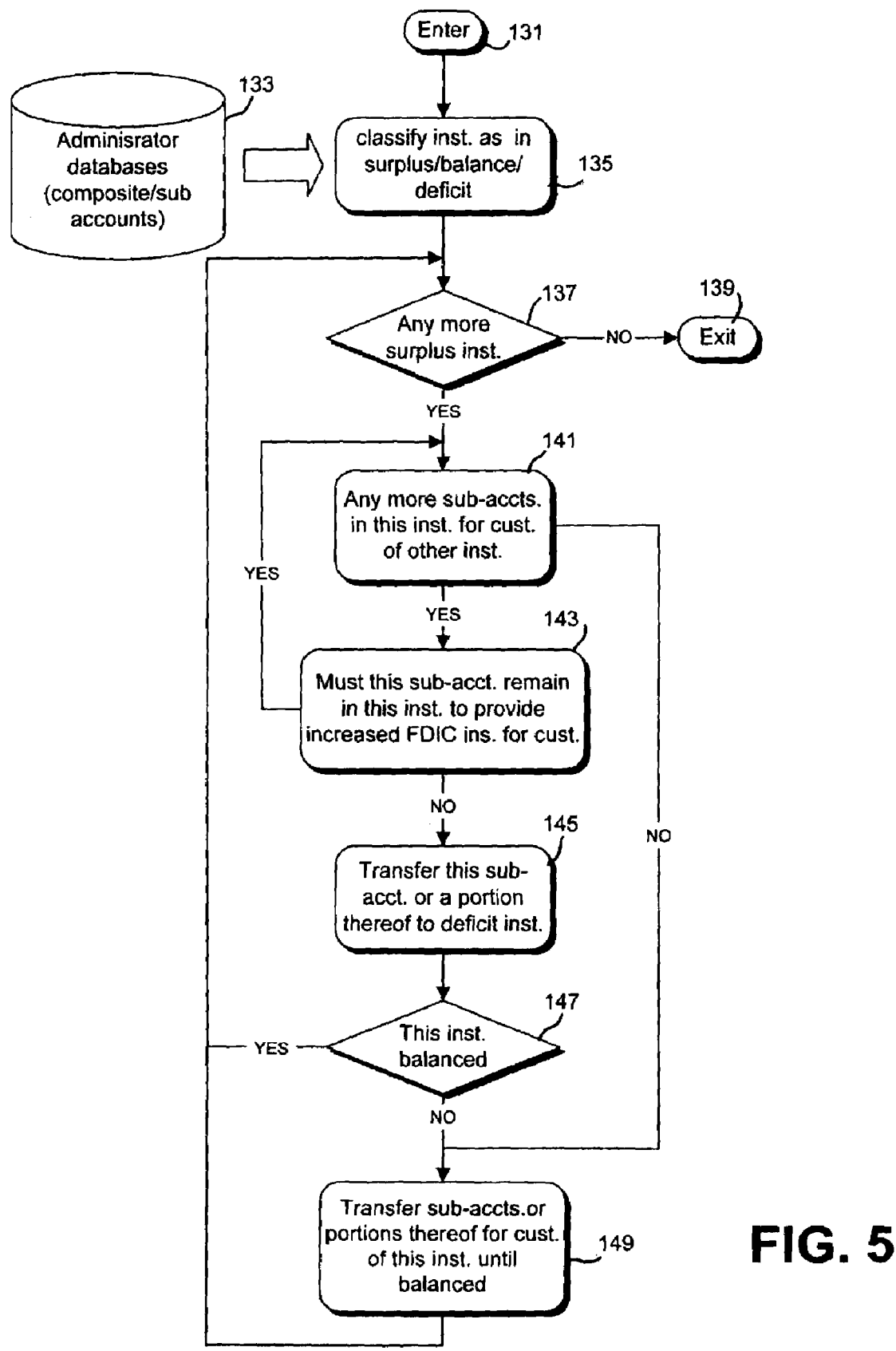
FIG. 5 illustrates re-allocation-processing steps of the periodic processing of this invention.

Now returning to this invention's processing methods, FIG. 5 illustrates funds re-allocation processing, step 59 (FIG. 2), in more detail in view of the prior example. After commencing 131, classification step 135 retrieves data from administrator databases 133, which store composite account and sub-account records, and classifies all participating financial institutions (for example, participating banks) as being in surplus, in balance, or in deficit according to the net_difference definition above. This classification is processed in a fashion analogous to the exemplary classification of Banks A, B, and C in the prior example. After surplus/balance/deficit classification 135, re-allocation processing determines 137 if there are any institutions are in surplus. Processing exits 139 if no further institutions are in surplus, because if there are no institutions in surplus, then all institutions are in balance. Any institution that is in deficit means that there are one or more other institutions in surplus, and conversely. (Similarly, processing may determine if there are any institutions in deficit.) However, if at least one institutions is still in surplus (and thus one or more are still in deficit), re-allocation processing must continue.

Re-allocation processing seeks to transfer sub-account balances from surplus institutions to deficit institutions until all are in balance. Secondary sub-accounts are preferentially transferred out of a surplus institution to a deficit institution; however, if transfer of all secondary sub-accounts does not achieve balance, then primary sub-accounts, that is sub-accounts for customers of the surplus institution, are also transferred. Therefore, processing next finds 141 secondary sub-accounts at a surplus institution (which it should be recalled are sub-accounts for individuals who are not customers of that surplus institution). Certain secondary sub-accounts are "fixed," and may not be transferred to an in-deficit institution. For example, a candidate secondary sub-account may not be transferred if transfer of part or all of its current balance will decrease insurance coverage for that sub-account's owner. This will occur, for example, if the existing balances of that customer's sub-accounts at the currently in-deficit institutions are too close to (or are at) the target amount, and cannot accommodate funds from the candidate secondary sub-account. Test 143 bypasses all such "fixed" sub-accounts.

Having found a sub-account eligible for transfer, all of part is transferred 145 to an in-deficit institution. If the current in-surplus institution may be balanced by transfer of only a part of the eligible sub-account, the necessary part is transferred leaving the institution now in balance. Otherwise, the entire sub-account is transferred. Alternatively, as much as possible of the sub-account is transferred without causing a decrease in that customer's insurance coverage. If the current in-surplus institution is now in balance 147, re-allocation processing checks again 137 for another in-surplus institution. However, if transfer of all possible funds from secondary sub-accounts does not balance the current in-surplus institution, then funds will be transferred from one or more primary sub-accounts. Primary sub-accounts are selected and processed for transfer 149 in a fashion analogous to that for secondary sub-accounts. However, transfers that will decrease insurance coverage for the account's owner are not allowed.

Transfers of funds preferably are determined to leave the financial institutions exactly in balance with a net_difference of zero. However, in certain embodiments it may not be possible to exactly balance institutions because of, for example, funds transfer restrictions, timing differences between transaction processing and funds transfer, and the like. In such embodiments, financial institutions should be substantially in balance by having the net_difference to be no more than 5%, or 2%, or 1%, or 0.5%, or 0.1% of the total customer account balances.

Additionally, the methods of this invention preferably generate customer statements that display the customer transaction activity posted to the composite account along with the customer's balances (in sub-accounts) held at each participating financial institution or bank. These statements are usually generated monthly.

Systems Preferred for this Invention

Figure 6:
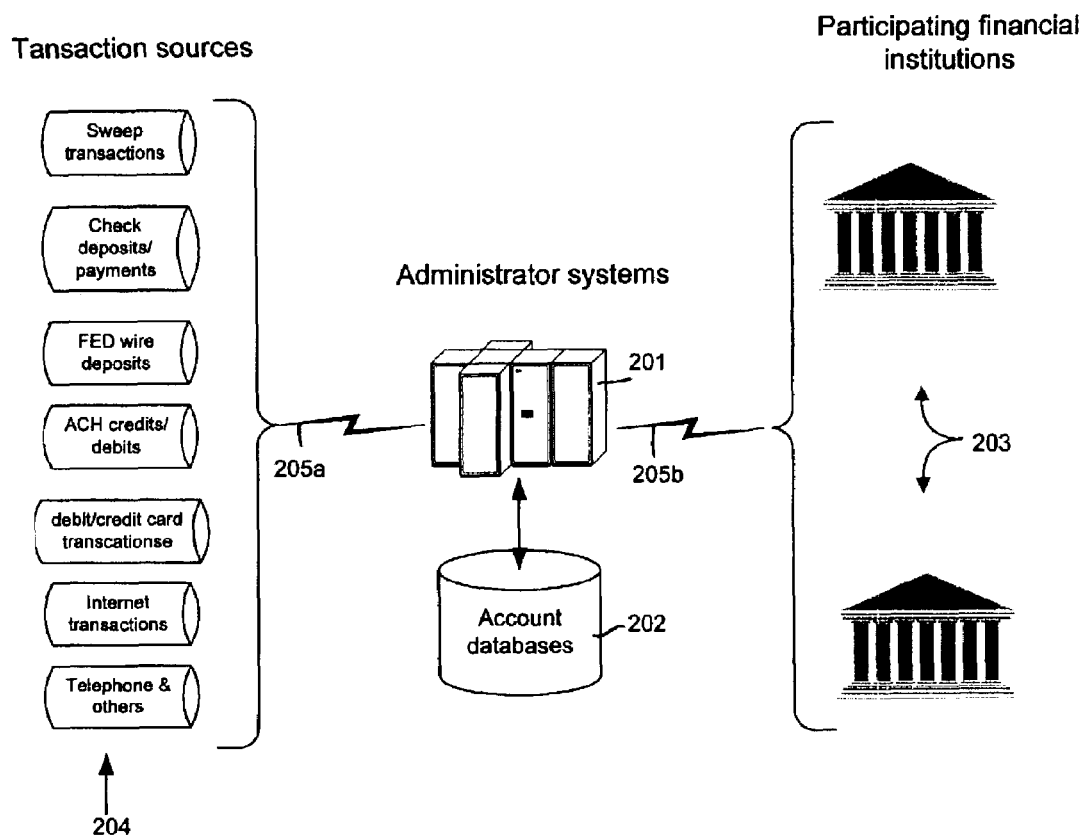
FIG. 6 illustrates exemplary systems for practicing the present invention.

FIG. 6 generally illustrates exemplary administrator systems of this invention, which, along with certain external system with which the administrator systems cooperate, are for performing the above-described methods of this invention. Computer system 201, including processing unit, memory, communication interface, user interfaces, and the like, is configured with a performance and reliability acceptable for financial processing as is known in the arts. For example, such computers along with industrial-strength operating software are available from IBM and other well known manufacturers. Administrator systems also include database storage 202, preferably highly reliable, for storing account data, including composite account data, sub-account data, MMDA-DDA account-pair data, and such other administrative data needed for customer funds management.

The methods of this system are programmed, preferably in a suitable, commercial or financial programming language, and translated into machine instructions which cause computer 201 and its operating software and database 202 to perform this invention's methods. This invention also includes program products comprising computer readable media containing encoded representations of such machine instructions. Such computer readable media are well known in the art (and include network distribution).

In order to perform this invention's methods, the administrator systems are preferably in communication with external systems which provide important data, such as sources 204 of customer transaction data. This invention includes processing, posting, and allocation of various types of customer transactions, for example, ACH credit/debit transactions, debit and credit card transactions, sweep transaction from participating financial institutions, check/draft payments and deposits, FED wire transfers, and transactions originating over the telephone, the internet, in person, and so forth. Generally, as known in the art, different transaction types originate from different external systems, and may arrive transaction-by-transaction or may be batched into periodic (e.g., daily) transaction files.

In most embodiments, the administrator systems are in communication with external systems 203 of the participating financial institutions. For participating banking institutions, both customer account information and MMDA-DDA account-pair information may be exchanged with their external systems 203. For other types of participating financial institutions, primarily customer account information is exchanged, while related MMDA-DDA account-pair information is exchanges with the systems of that institutions affiliated or associated bank. In certain embodiments, one or more of the participating financial institutions may directly receive customer transactions and then exchange them with the administrator systems as a batch file. Accordingly, communications between the administrator systems, the transaction source systems, and the participating financial institution systems may be direct or indirect.

Finally, communication links 205a and 205b between these systems may be of the many types known in the art. They may be private links that are used only for the purposes of this invention. Alternatively, these links may be shared as part of private clearing house networks, of bank card networks, of Federal Reserve Board networks, and the like. As also known in the art. These links may be configured as point-to-point links, or a networks, or a networks of networks, such as the Internet.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

What is claimed is:

1. A method for managing funds for a plurality of primary customers of a first financial institution that are participating in a program whose funds were accepted for deposit in respective primary customer accounts held in the respective names of the respective primary customers at the first financial institution, comprising:
   (a) maintaining one or more FDIC-insured and interest-bearing aggregated deposit accounts at the first financial institution;
   (b) maintaining one or more FDIC-insured and interest-bearing aggregated deposit accounts at each of one or more different financial institutions;
   (c) maintaining or having maintained or accessing by one or more computers an electronic database, on one or more computer-readable media, comprising information on a balance of funds held by each respective primary customer of the first financial institution in the respective primary customer account in the first financial institution and an amount of such funds held in the one or more aggregated deposit accounts in the first financial institution and an amount or respective amounts of such funds held in the one or more different financial institutions;

(d) receiving electronic client transaction data describing debit and/or credit transactions made by a plurality of the primary customers against their respective primary customer accounts;

(e) determining or having determined or receiving electronically for each of the plurality of the primary customer accounts of the first financial institution an updated balance of funds in the respective primary customer account resulting from one or more debit and/or credit transactions associated with the respective primary customer received in the electronic client transaction data;

(f) determining by one or more computers, for each of a plurality of the respective primary customer accounts of the first financial institution, a respective excess amount relative to a specified amount;

(g) allocating a respective excess amount associated with each of a plurality of respective primary customer accounts of the first financial institution to one or more of the aggregated deposit accounts in a different one or more of the financial institutions;

(h) determining by one or more computers a first amount of funds comprised of funds associated with a plurality of the respective primary customers of the first financial institution allocated or to be allocated to one or more of the aggregated deposit accounts in the different one or more of the financial institutions, wherein the first amount of funds at least approximates a total of the respective excess amounts determined for the respective primary customer accounts of the plurality of the primary customers of the first financial institution;

(i) determining by one or more computers a second amount of funds comprising funds associated with one or more primary customer accounts of one or more of the other financial institutions from one or more of the aggregated deposit accounts in one or more of the other financial institutions, with the second amount to be transferred to the first financial institution, with the second amount of funds being based on the first amount of funds;

(j) allocating funds associated with the second amount from the one or more primary customer accounts of the one or more of the other financial institutions to the one or more aggregated accounts of the first financial institution;

(k) updating or having updated in the electronic database the balance of funds held by respective primary customers of the first financial institution in their respective primary customer accounts and the amount of such funds held in the one or more aggregated deposit accounts in the first financial institution and the amount or amounts of such funds held in one or more aggregated deposit accounts held in the one or more of the different financial institutions based on the allocating steps; and (l) generating and outputting at least one instruction to transfer funds between aggregated deposit accounts based at least in part on results of one or more of the allocating steps.

2. The method as defined in claim 1, wherein the second amount allocated is equal to the first amount.

3. The method as defined in claim 1, wherein the second amount is greater than the first amount.

4. The method as defined in claim 1, wherein the second amount is less than the first amount.

5. The method as defined in claim 1, further comprising:
receiving via an electronic communication at least one transaction from an external system, wherein the external system is for ACH credit/debit transactions, or for debit and credit card transactions, or for sweep transactions from financial institutions, or for check/draft payments and deposits, or FED wire transfers, or for transactions originating over the telephone, or the internet for one of the primary customers of the first financial institution who also has funds in one or more of the aggregated deposit accounts in one or more of the other financial institutions; and issuing at least one instruction to transfer funds in accordance with the at least one transaction; and reallocating an amount of funds from one or more of the aggregated deposit accounts at the different financial institutions to the at least one aggregated deposit account in the first financial institution to maximize funds of the one primary customer held in the first financial institution but with the balance of those funds in the first financial institution remaining equal to or less than the specified amount.

6. The method as defined in claim 1, further comprising:
receiving via an electronic communication at least one transaction from an external system, wherein the external system is for ACH credit/debit transactions, or for debit and credit card transactions, or for sweep transactions from financial institutions, or for check/draft payments and deposits, or FED wire transfers, or for transactions originating over the telephone, or the internet for one of the primary customers of the first financial institution who also has funds in one or more of the aggregated deposit accounts in one or more of the other financial institutions;

selecting one of the aggregated deposit accounts holding funds of the one customer in one of the different financial institutions; and reallocating an amount of funds from the selected aggregated deposit account at the one different financial institution for the at least one transaction.

7. The method as defined in claim 1, further comprising:
transferring or having transferred funds between aggregated deposit accounts based at least in part on results of one or more of the allocating steps.

8. The method as defined in claim 1, further comprising adding new deposits from a primary customer of the first financial institution to one of more of the aggregated deposit accounts in the first financial institution, unless an amount of funds held by the primary customer in the program in the first financial institution equals or exceeds the specified amount.

9. The method as defined in claim 1, further comprising:
performing the allocation of the second amount only if one or more allocations of first amounts equals or exceeds a threshold amount.

10. The method as defined in claim 1, wherein the determining an excess amount step comprises
determining an excess amount by which a balance of funds in the respective primary customer account exceeds the specified amount.

11. The method as defined in claim 1, wherein the determining an excess amount step comprises
determining an excess amount by which an amount of funds of the respective primary customer account held in the first financial institution exceed the specified amount.

12. A method for managing funds, in a plurality of financial institutions participating in a program, for a plurality of primary customer accounts of a plurality of primary customers, with each respective primary customer having funds that were accepted for deposit in a primary customer account in the name of the primary customer at one of the plurality of financial institutions in the program, with that financial institution referred to as a primary financial institution for that primary customer, comprising:
- (a) maintaining a plurality of FDIC-insured and interest-bearing aggregated deposit accounts, with one or more of the aggregated deposit accounts held in each different one of the financial institutions;
- (b) maintaining or having maintained or accessing by one or more computers an electronic database, on one or more computer-readable media, comprising information on a balance of funds held by each respective primary customer in the respective primary customer account and an amount or respective amounts of such funds held in one or more of the plurality of aggregated deposit accounts in the plurality of financial institutions;
- c) receiving electronic client transaction data describing debit and/or credit transactions made by the primary customers against their respective primary customer accounts;
- (d) determining or having determined or receiving electronically for each primary customer account an updated balance of funds in the primary customer account resulting from the debit and/or credit transactions associated with the respective primary customer received in the electronic client transaction data;
- (e) determining by one or more computers, for each of a plurality of respective primary customer accounts, a respective excess amount by which a balance of funds in that primary customer account in its respective primary financial institution exceeds a specified amount;
- (f) allocating a respective excess amount associated with each of a plurality of the one or more respective primary customer accounts of the first financial institution to one or more of the aggregated deposit accounts in a different one or more of the financial institutions;
- (g) determining by one or more computers from a plurality of the excess amounts determined from a plurality of primary customer accounts in one of the financial institutions that were or are to be allocated to one or more of the aggregated deposit accounts in one or more of the other financial institutions a first amount;
- (h) allocating by one or more computers to the one financial institution a second amount of funds comprising funds associated with one or more primary customer accounts of one or more of the other financial institutions from one or more of the aggregated deposit accounts at one or more of the other financial institutions, with the second amount based on a difference between a sum of funds deposited in the one or more aggregated deposit accounts of the one financial institution associated with the program and a sum of current balances in all of the primary customer accounts of the primary customers in the program associated with the one financial institution;
- (i) updating or having updated in the electronic database the balance of funds held by each respective primary customer in the respective primary customer account and an amount or respective amounts of such funds held in one or more of the plurality of aggregated deposit accounts in the plurality of financial institutions based on the allocating steps; and
- j) generating and outputting at least one instruction to transfer funds between aggregated deposit accounts based at least in part on results of one or more of the allocating steps.

13. The method as defined in claim 12, wherein the second amount allocated is equal to the difference between the sum of current balances in all of the primary customer accounts associated with the first financial institution in the program and funds deposited in the one or more aggregated deposit accounts of the primary financial institution.

14. The method as defined in claim 12, further comprising:
receiving via an electronic communication at least one transaction from an external system, wherein the external system is for ACH credit/debit transactions, or for debit and credit card transactions, or for sweep transactions from financial institutions, or for check/draft payments and deposits, or FED wire transfers, or for transactions originating over the telephone, or the internet for one of the primary customers of one of the financial institutions who also has funds in one or more of the aggregated deposit accounts in one or more of the other financial institutions; and
issuing at least one instruction to transfer funds in accordance with the at least one transaction; and
reallocating an amount of funds from one or more of the aggregated deposit accounts at the different financial institutions to the at least one aggregated deposit account in the one financial institution to maximize funds of the one primary customer held in the one financial institution but with the balance of those funds in the one financial institution remaining equal to or less than the specified amount.

15. The method as defined in claim 12, further comprising:
receiving via an electronic communication at least one transaction from an external system, wherein the external system is for ACH credit/debit transactions, or for debit and credit card transactions, or for sweep transactions from financial institutions, or for check/draft payments and deposits, or FED wire transfers, or for transactions originating over the telephone, or the internet for one of the primary customers of one of the financial institutions who also has funds in one or more of the aggregated deposit accounts in one or more of the other financial institutions;
selecting one of the aggregated deposit accounts in one of the other financial institutions holding funds of the one customer; and
reallocating an amount of funds from the selected aggregated deposit account at the one different financial institutions for the at least one transaction to the at least one aggregated deposit account in the one financial institution.

16. The method as defined in claim 12, further comprising:
transferring or having transferred funds between the financial institutions based at least in part on results of one or more of the allocating steps.

17. The method as defined in claim 12, further comprising:
performing the allocation of the second amount only after the difference equals or exceeds a threshold amount.

18. The method as defined in claim 12, further comprising:
selecting one of the financial institutions based at least in part on an amount of the difference between a sum of the funds deposited in the one or more aggregated deposit accounts of the one financial institution associated with the program and a sum of current balances in all of the primary customer accounts of the primary customers in the program associated with the one financial institution; and
issuing at least one instruction to transfer funds to the selected one of the financial institutions.

* * * * *

UNITED STATES PATENT AND TRADEMARK OFFICE
CERTIFICATE OF CORRECTION

| | |
|---|---|
| PATENT NO. | : 7,536,350 B1 |
| APPLICATION NO. | : 10/382946 |
| DATED | : May 19, 2009 |
| INVENTOR(S) | : Bruce Bent and Bruce Bent, II |

It is certified that error appears in the above-identified patent and that said Letters Patent is hereby corrected as shown below:

IN THE CLAIMS:

Claim 8, Col. 24, line 43, after "one" delete "of" and replace it with --or--.

Claim 12, Col. 25, line 16 delete "c)" and replace it with --(c)--.

Claim 12, Col. 25, line 61 delete "j)" and replace it with --(j)--.

Signed and Sealed this

Seventh Day of July, 2009

JOHN DOLL
*Acting Director of the United States Patent and Trademark Office*